(12) United States Patent
Okayama et al.

(10) Patent No.: US 11,537,804 B2
(45) Date of Patent: Dec. 27, 2022

(54) WIRELESS TAG SYSTEM

(71) Applicant: DENSO WAVE INCORPORATED, Aichi-pref. (JP)

(72) Inventors: Yousuke Okayama, Chita-gun (JP); Koji Konosu, Chita-gun (JP); Kentarou Maruyama, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 17/292,619

(22) PCT Filed: Nov. 8, 2019

(86) PCT No.: PCT/JP2019/043819
§ 371 (c)(1),
(2) Date: May 10, 2021

(87) PCT Pub. No.: WO2020/096034
PCT Pub. Date: May 14, 2020

(65) Prior Publication Data
US 2022/0012438 A1    Jan. 13, 2022

(30) Foreign Application Priority Data

Nov. 8, 2018 (JP) .............................. JP2018-210438
Oct. 25, 2019 (JP) .............................. JP2019-194512

(51) Int. Cl.
*G06K 7/00* (2006.01)
*G06K 7/10* (2006.01)
*G06K 19/07* (2006.01)

(52) U.S. Cl.
CPC ..... *G06K 7/10158* (2013.01); *G06K 19/0715* (2013.01)

(58) Field of Classification Search
CPC ...................... G06K 7/10158; G06K 19/0715
(Continued)

(56) References Cited

U.S. PATENT DOCUMENTS

2006/0103533 A1   5/2006   Pahlavan et al.
2008/0018430 A1   1/2008   Yamazoe et al.
(Continued)

FOREIGN PATENT DOCUMENTS

EP       1160583 A2    12/2001
JP    2011-193298 A     9/2011
JP       5058951 B2    10/2012

OTHER PUBLICATIONS

Lee et al,; "Controlling mobile robots in distributed intelligent sensor network", IEEE Transactions on Industrial Electronics; 2003; pp. 890-902, vol. 50, No. 5.

*Primary Examiner* — Jamara A Franklin
(74) *Attorney, Agent, or Firm* — Oliff PLC

(57) ABSTRACT

A configuration that achieves stable wireless communication. In this configuration, electrical power according to transmission waves is reliably supplied to a wireless tag serving as a target of wireless communication. A first wireless communication device and a second wireless communication device are provided. Both the wireless communication devices substantially simultaneously transmit transmission waves on different channels separated from each other by a predetermined frequency or more on a frequency band in the frequency axis, when performing wireless communication processing to wirelessly communicate with a wireless tag in a predetermined communication area.

24 Claims, 15 Drawing Sheets

(58) Field of Classification Search
USPC .................................................. 235/375, 492
See application file for complete search history.

(56) References Cited

U.S. PATENT DOCUMENTS

2014/0218175 A1* 8/2014 Melville ................ G06K 7/016
340/10.2
2019/0287354 A1 9/2019 Yahata et al.

* cited by examiner

WIRELESS TAG SYSTEM

CROSS-REFERENCE TO RELATED APPLICATION

This application is based on and claims the benefit of priority from earlier Japanese Patent Applications No. 2018-210438 filed on Nov. 8, 2018 and No. 2019-194512 filed on Oct. 25, 2019 the descriptions of which are incorporated herein by reference.

BACKGROUND

Technical Field

The present invention relates to a wireless tag system including a wireless communication device whose wireless communication target is a wireless tag present in a predetermined communication area such as a defined space.

RELATED ART

Background Art

Wireless tags present (or placed) in a predetermined defined communication area, such as in a box for storing articles, have often been read through wireless communication, and the frequency of reading wireless tags in this way has been increased. When performing reading in this way, there may be produced a range in which radio waves cannot be received (a null range) due to reflection or the like of radio waves, depending on the surrounding environment. In such a situation, if a wireless tag is arranged in this null range, stable communication is not necessarily performed with the wireless tag. This is because the wireless tag present in the null range cannot sufficiently receive transmission waves from the wireless communication device, and thus the electrical power required for operation as a wireless tag cannot be obtained.

As a technique for solving this issue, for example, there is known a tag communication device as disclosed in PTL 1 below. This tag communication device is provided with two antennas, and the phase of radio waves transmitted from each antenna is changed at a predetermined cycle so as not to fix the position of the communication-disabled region (null range) and to thereby prevent RFID tags from being disabled in communication.

CITATION LIST

Patent Literature

[PTL 1] JP 2011-193298 A

However, in the configuration in which the phases of the radio waves transmitted from the two antennas are changed at a predetermined cycle as described above, there is an issue of not only increasing the manufacturing cost due to the need of a dedicated transmission circuit or the like, but also limiting the sites of placing the antennas.

SUMMARY

Thus it is desired to provide a configuration capable of realizing stable wireless communication by reliably supplying electrical power according to transmission waves to a wireless tag as a target of wireless communication, while minimizing an increase in manufacturing cost as much as possible and avoiding restrictions on the sites of arranging antennas for use in electrical power supply as much as possible.

To achieve the above aim, according to a first exemplary embodiment, there is provided a wireless tag system (10) including two or more wireless communication devices (30, 40) including a wireless tag (T, T1 to T3) as a target of wireless communication in a predetermined communication area (S). In the system, the two or more wireless communication devices simultaneously transmit transmission waves for a predetermined period of time or more on different channels which are separated from each other by a predetermined channel number or more, when performing wireless communication processing to wirelessly communicate with the wireless tag.

It should be noted that the bracketed reference signs indicate correspondence to the specific means in the embodiments described later.

In the first exemplary embodiment, the two or more wireless communication devices simultaneously transmit transmission waves on different channels separated from each other by a predetermined frequency or more on a frequency band, when performing wireless communication processing to wirelessly communicate with the wireless tag in the predetermined communication area. Thus, transmission waves from a plurality of wireless communication devices are received by one wireless tag, and the electrical power required for the operation of the wireless tag can be easily obtained. Therefore, electrical power according to the transmission waves can be reliably supplied to the wireless tag as a target of communication, and consequently, stable wireless communication can be achieved.

In a second exemplary embodiment, at least some of the two or more wireless communication devices transmit unmodulated waves as the transmission waves to the wireless tag to supply electrical power. Since unmodulated waves have a higher electrical power density than modulated waves modulated to carry signals, electrical power according to the transmission waves (unmodulated waves) can be more reliably supplied to the wireless tag as a target of communication. Accordingly, even more stable wireless communication can be achieved.

In a third exemplary embodiment, any one of the two or more wireless communication devices supplies a transmission instruction related to transmission of the transmission waves to the rest of the wireless communication devices at every time point of transmitting the transmission waves; and the rest of the wireless communication devices perform the wireless communication processing according to the transmission instruction received. Thus, channels and transmission times of the wireless communication devices can be easily controlled. In particular, there is no need to use higher-level devices that control the wireless communication devices. In addition to that, even if a specific channel becomes unavailable, the wireless communication devices can be controlled so as to avoid that channel.

In a fourth exemplary embodiment, any one of the two or more wireless communication devices transmits a control table, in which at least channels and transmission times of the transmission waves are time-scheduled, to the rest of the wireless communication devices; and the rest of the wireless communication devices perform wireless communication processing according to the control table received. Thus, channels and transmission times of the wireless communication devices can be easily controlled. In particular, there is no need to use higher-level devices that control the wireless communication devices. In addition, there is no need to communicate with other wireless communication devices every time transmission waves are transmitted. Accordingly, frequency of communication between devices can be reduced.

In a fifth exemplary embodiment, at least some of the two or more wireless communication devices include a detection unit that detects a transmission status of the transmission waves from the rest of the wireless communication devices, and simultaneously transmit the transmission waves according to detection results derived from the detection unit, for a predetermined period of time or more on a channel different and separated from channels of the rest of the wireless communication devices by a predetermined frequency or more, when performing the wireless communication processing. Thus, channels and transmission times of the wireless communication devices can be easily controlled. In particular, there is no need to use higher-level devices that control the wireless communication devices. In addition to that, there is no need to use a wireless communication device that serves as a master unit for controlling other wireless communication devices. Therefore, even if one of the wireless communication devices fails, disabling transmission of transmission waves, stable wireless communication can be continued.

In a sixth exemplary embodiment, the system includes a control device that provides a transmission instruction related to transmission of the transmission waves to the two or more wireless communication devices; and the two or more wireless communication devices perform the wireless communication processing according to the transmission instruction received from the control device. Thus, the control device can collectively perform control related to transmission of transmission waves of all the wireless communication devices. In particular, even in a situation where a specific channel cannot be used, the wireless communication devices can be controlled so as to avoid the specific channel in question.

In a seventh exemplary embodiment, the system includes a control device that transmits a control table, in which at least channels and transmission times of the transmission waves are time-scheduled, to the two or more wireless communication devices; and the two or more wireless communication devices perform the wireless communication processing according to the control table received from the control device. Thus, the control device can collectively perform control related to transmission of transmission waves to all the wireless communication devices. In particular, since there is no need to communicate with the control device every time transmission waves are transmitted, frequency of communication with the control device can be reduced.

In an eighth exemplary embodiment, there are provided an outer box and an inner box, the outer box disabling passage of radio waves except through an opening, and the inner box being held in the outer box via the opening and enabling passage of radio waves. The predetermined communication area is configured by an internal space defined by the inner box that is held in the outer box. An antenna of the first wireless communication device and an antenna of the second wireless communication device are each arranged between an inner surface of the outer box and an outer surface of the inner box.

Thus, leakage of transmission waves from the outer box (casing) to the outside is minimized, so that electrical power can be reliably supplied to the wireless tag arranged in the internal space of the inner box as a predetermined communication area. In particular, in the vicinity of the inner surface of the outer box, a null region is likely to occur due to reflection of radio waves on the inner surface; however, since the internal space of the inner box held in the outer box serves as a predetermined communication area, the wireless tag in the internal space (predetermined communication area) of the inner box can be away from the vicinity of the inner surface of the outer box. Therefore, electrical power can be reliably supplied to the wireless tag in the internal space of the inner box.

In a ninth exemplary embodiment, the antenna of the first wireless communication device is arranged between an inner bottom surface of the outer box and an outer surface of the inner box, and the antenna of the second wireless communication device is arranged between any one of the four inner side surfaces and an outer surface of the inner box. Thus, the output direction of the transmission waves transmitted from the antenna of the first wireless communication device becomes substantially orthogonal to the output direction of the transmission waves transmitted from the antenna of the second wireless communication device. Accordingly, electrical power can be reliably supplied to the wireless tag regardless of the orientation of the wireless tag in the internal space of the inner box.

In a tenth exemplary embodiment, the antenna of the second wireless communication device is arranged being inclined with respect to the inner side surface so that an output direction of the transmission waves is away from the opening. Thus, the transmission waves transmitted from the antenna are less likely to leak from the opening as compared with the case where the antenna of the second wireless communication device is inclined with respect to the inner side surface in a direction in which the output direction of the transmission waves approaches the opening. Accordingly, erroneous reading of a wireless tag located outside the predetermined communication area can be minimized.

In an eleventh exemplary embodiment, four antennas are respectively arranged between inner surfaces of the outer box and outer surfaces of the inner box so that a first antenna of the first wireless communication device faces a first antenna of the second wireless communication device and a second antenna of the first wireless communication device faces a second antenna of the second wireless communication device. The first wireless communication device and the second wireless communication device simultaneously perform the wireless communication processing for a predetermined period of time or more on different channels which separate transmission waves transmitted from the first antenna of the first wireless communication device from transmission waves transmitted from the first antenna of the second wireless communication device by a predetermined frequency or more, or also simultaneously perform the wireless communication processing for a predetermined period of time or more on different channels which separate transmission waves transmitted from the second antenna of the first wireless communication device from transmission waves transmitted from the second antenna of the second wireless communication device by a predetermined frequency or more.

Thus, there can be provided a time when electrical power is supplied to the wireless tag in the internal space of the inner box (in the predetermined communication area) with the transmission waves transmitted from the first antenna of the first wireless communication device and the transmission waves transmitted from the first antenna of the second wireless communication device, and a time when electrical power is supplied to the wireless tag with the transmission waves transmitted from the second antenna of the first wireless communication device and the transmission waves transmitted from the second antenna of the second wireless communication device. In particular, since transmission waves are simultaneously transmitted from both antennas facing each other for a predetermined period of time or more, the radio waves can be easily mutually intensified and electrical power supplied to the wireless tag can be increased. Therefore, even if the radio wave intensity of the transmission waves is lowered for the purpose of minimizing erroneous reading of wireless tags located outside the predetermined communication area, electrical power can be reliably supplied to the wireless tag which is a target of wireless communication, according to the transmission waves.

In a twelfth exemplary embodiment, four antennas are respectively arranged between inner surfaces of the outer box and outer surfaces of the inner box so that a first antenna and a second antenna of the first wireless communication face each other, and a first antenna and a second antenna of the second wireless communication face each other. The first wireless communication device and the second wireless communication device simultaneously perform the wireless communication processing for a predetermined period of time or more on different channels at which separate transmission waves are transmitted from the first antenna of the first wireless communication device and from the first antenna of the second wireless communication device, the different channel being separate from each other by a predetermined channel number (or frequency) or more, or also simultaneously perform the wireless communication processing for a predetermined period of time or more on different channels at which separate transmission waves are transmitted from the second antenna of the first wireless communication device and from the second antenna of the second wireless communication device, the different channel being separate from each other by a predetermined channel number (or frequency) or more.

Thus, there can be provided a time when electrical power is supplied to the wireless tag in the internal space of the inner box (in the predetermined communication area) with the transmission waves transmitted from the first antenna of the first wireless communication device and the transmission waves transmitted from the first antenna of the second wireless communication device, and a time when electrical power is supplied to the wireless tag with the transmission waves transmitted from the second antenna of the first wireless communication device and the transmission waves transmitted from the second antenna of the second wireless communication device. Therefore, even if the radio wave intensity of the transmission waves is lowered for the purpose of minimizing erroneous reading of wireless tags located outside the predetermined communication area, electrical power can be reliably supplied to the wireless tag as a target of wireless communication, according to the transmission waves.

In a thirteenth exemplary embodiment, the two or more wireless communication devices include a third wireless communication device in addition to the first wireless communication device and the second wireless communication device. The present wireless tag system includes a reading unit that reads information from the wireless tag in the predetermined communication area as an internal space defined by the inner box, using wireless communication results derived from the first wireless communication device, the second wireless communication device, and the third wireless communication device. An antenna of the third wireless communication device is arranged outside the outer box.

Thus, the wireless tag can read not only by the first wireless communication device and the second wireless communication device but also by the third wireless communication device which can be determined to be a wireless tag having a high probability of being located outside the predetermined communication area. Thus, erroneous reading of wireless tags located outside the predetermined communication area can be minimized.

In a fourteenth exemplary embodiment, the antenna of the third wireless communication device is arranged outside the outer box so as to be located around the opening. Thus, the third wireless communication device can easily read the wireless tag located on the surface around the opening which is outside the predetermined communication area, compared to the first wireless communication device and the second wireless communication device. This can minimize erroneous reading due to the first wireless communication device or the second wireless communication device reading the wireless tag located on the surface around the opening.

In a fifteenth exemplary embodiment, the antenna of the third wireless communication device is arranged being inclined with respect to a plane provided by the opening so that an output direction of transmission waves is away from the opening. Thus, the third wireless communication device is less likely to read the wireless tag located in the predetermined communication area, minimizing erroneous reading due to the reading performed by the third wireless communication device.

In a sixteenth exemplary embodiment, the reading unit reads information from the wireless tag in the predetermined communication area as an internal space defined by the inner box, using received signal strength (RSSI) as a result of wireless communication of the first wireless communication device, the second wireless communication device, and the third wireless communication device. In the first wireless communication device or the second wireless communication device, the received signal strength when reading the wireless tag in the predetermined communication area is higher than the received signal strength when reading the wireless tag outside the predetermined communication area. In the third wireless communication device, the received signal strength when reading a wireless tag outside the predetermined communication area is arranged to be higher than the received signal strength when reading the wireless tag in the predetermined communication area. Therefore, even if wireless tags are read by all the wireless communication devices, the wireless tag whose received signal strength is higher in the first wireless communication device or the second wireless communication device is determined to be a wireless tag in the predetermined communication area, and the wireless tag whose received signal strength is higher in the third wireless communication device is determined to be a wireless tag outside the predetermined communication area. Thus, an accurate determination can be made as to whether the read wireless tag is in the predetermined communication area.

In a sixteenth exemplary embodiment, wireless communication of the first wireless communication device and the second wireless communication device, and wireless communication of the third wireless communication device are mutually exclusively performed. Thus, the electric power obtained by the wireless tag according to the transmission waves from the first wireless communication device or the second wireless communication device is not used during wireless communication with the third wireless communication device. Accordingly, since measurement accuracy of the received signal strength obtained during wireless communication of the third wireless communication device is enhanced, a more accurate determination can be made as to whether the read wireless tag is in the predetermined communication area.

DESCRIPTION OF THE EMBODIMENTS

First Embodiment

A first embodiment of a wireless tag system according to the present invention will be described with reference to the drawings.

Figure 1:
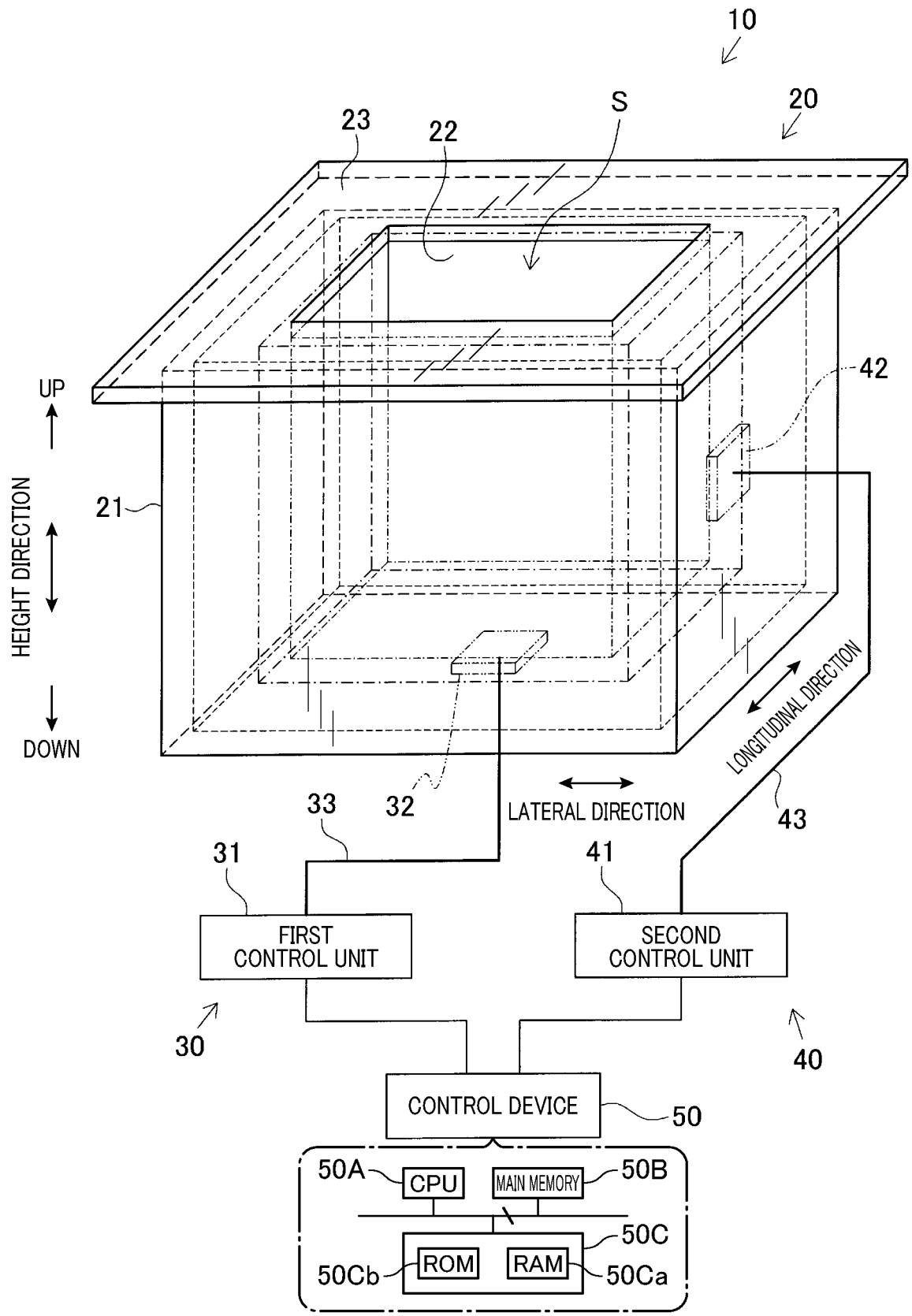
FIG. 1 is a schematic diagram illustrating a configuration of a wireless tag system according to a first embodiment.

A wireless tag system 10 according to the present embodiment is configured as a system including two or more wireless communication devices having one or two or more wireless tags as targets of wireless communication arranged in a predetermined communication area S defined such as by a box (casing) for storing products. Specifically, as shown in FIG. 1, the wireless tag system 10 includes a storage box (casing) 20 for defining the predetermined communication area S, two wireless communication devices (also termed a first wireless communication device 30 and a second wire- less communication device 40 hereinafter), and a control device 50 that manages both wireless communication devices.

Figure 2:
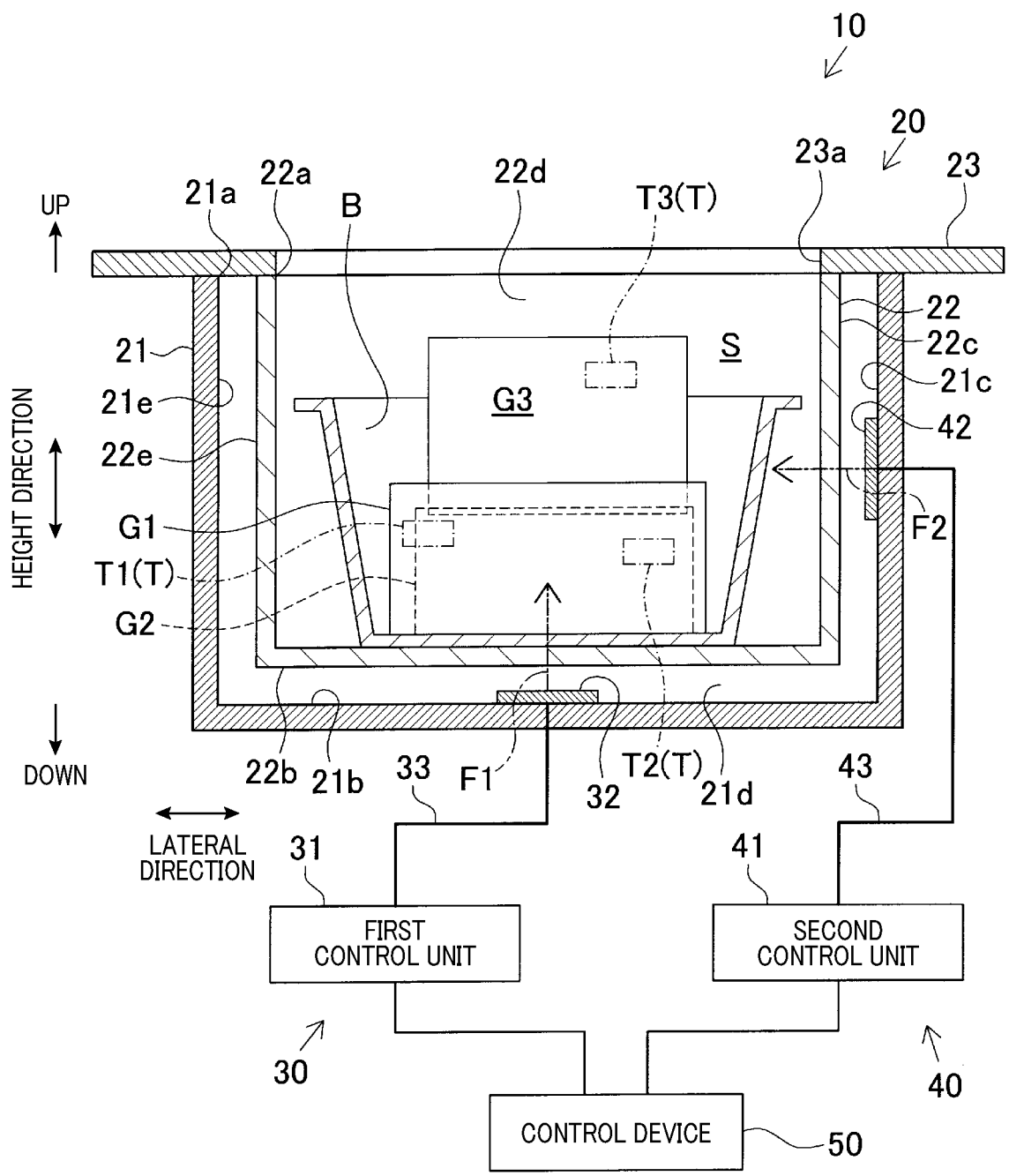
FIG. 2 is a cross-sectional view illustrating a part of a storage box shown in FIG. 1.
Figure 3:
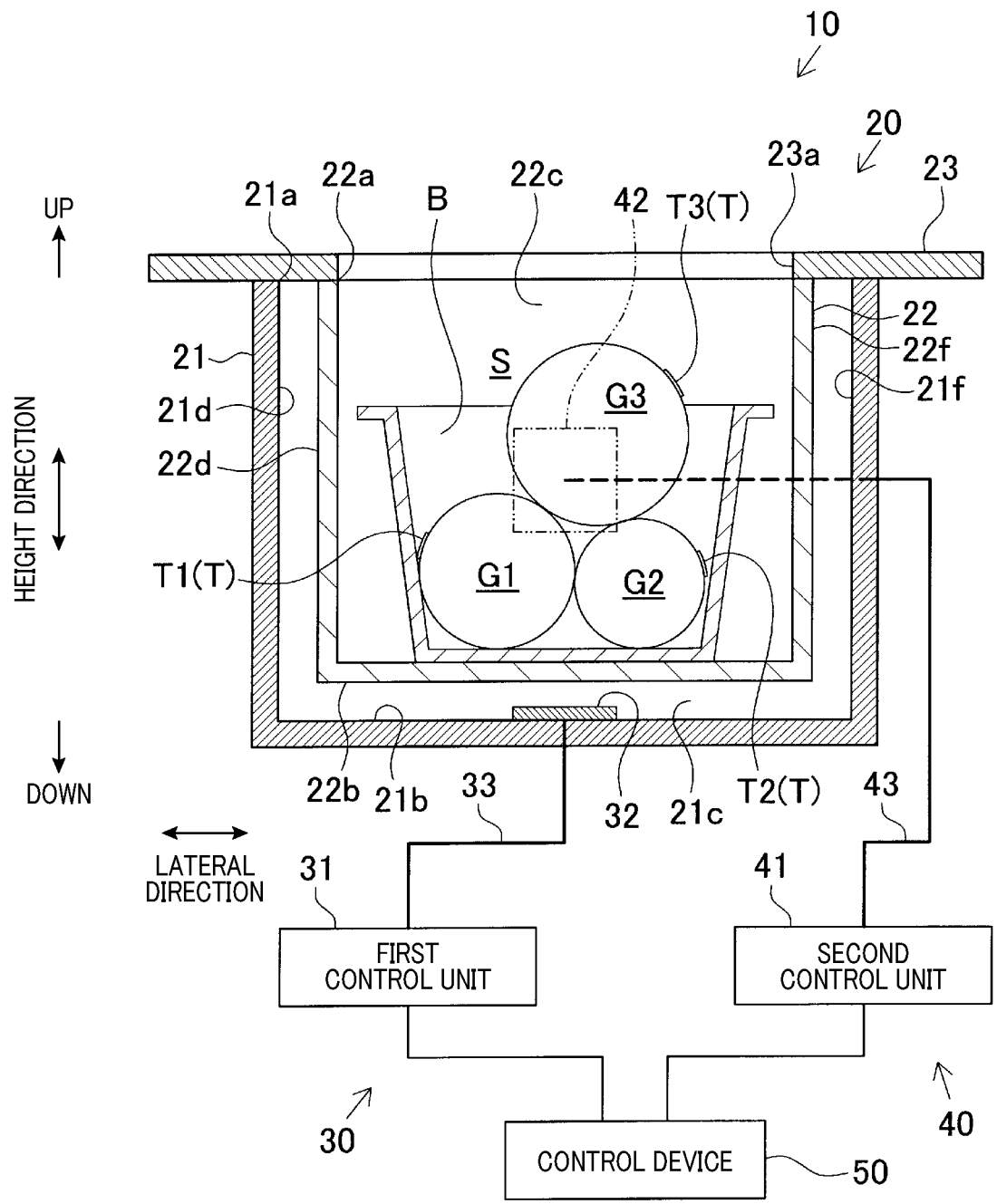
FIG. 3 is a cross-sectional view illustrating a part of the storage box shown in FIG. 1, taken along a plane perpendicular to the cross section shown in FIG. 2.

The wireless tag system 10 is arranged in the vicinity of a POS register used for selling products and has a wireless tag (RFID tag) T in the storage box 20 as a target of wireless communication to transmit product information and other information read from the wireless tag T to the POS register and the like through wireless communication. As can be seen from FIGS. 2 and 3, one or two or more products with respective wireless tags T are placed in a shopping basket B held in the storage box 20, so that the POS register and the like can acquire product information and other information from the wireless tag system 10. It should be noted that FIGS. 2 and 3 show a state in which a product G1 with a wireless tag T1, a product G2 with a wireless tag T2, and a product G3 with a wireless tag T3 are placed in the shopping basket B.

First, referring to the drawings, the storage box 20 will be described in detail.

Since the storage box 20 is formed in a box shape as a whole, it has a vertical direction, and has a lateral direction and a depth direction (or a longitudinal direction) which are both orthogonal to the vertical direction. The lateral direction and the depth direction (longitudinal direction) are reversed depending on the direction in which the storage box 20 is viewed.

The storage box 20 includes an outer box (casing) 21, an inner box 22, and a top plate 23. The outer box 21 is made of a material, e.g., a metal plate, that blocks radio waves to disable passage therethrough. The outer box 21 has an opening 21a on top in the vertical direction, and has inner surfaces, i.e., a rectangular inner bottom surface 21b facing the opening 21a, and four inner side surfaces 21c to 21f respectively connected to four sides of the inner bottom surface 21b. The inner side surfaces 21c to 21f define the opening 21a at the upper edges thereof in a state where the inner side surfaces 21c and 21e face each other and the inner side surfaces 21d and 21f face each other.

The inner box 22 is a box opened on top to hold the shopping basket B inserted from above in the vertical direction, that is, a box defining an internal space for holding the shopping basket B to serve as the predetermined communication area S mentioned above. The inner box 22 is made of a material, e.g., a synthetic resin, enabling radio waves to pass therethrough. The inner box 22 is configured to have an opening 22a on top through which the shopping basket B can be inserted, and to have outer surfaces, i.e., a rectangular outer bottom surface 22b and four outer surfaces 22c to 22f respectively connected to four sides of the outer bottom surface 22b. The outer surfaces 22c to 22f define the opening 22a at the upper edges thereof. The inner box 22 configured in this way is held in the outer box 21 via a predetermined gap. Specifically, the inner box 22 is formed so that, when it is held, the opening 22a is substantially flush with the opening 21a, and the outer bottom surface 22b faces the inner bottom surface 21, while the outer side surfaces 22c to 22f face the respective inner side surfaces 21c to 21f.

The top plate 23 is made of a material, e.g., a metal plate, that blocks radio waves to disable passage therethrough. The top plate 23 has outer edges, which are larger than those of the opening 21a of the outer box 21, and define an opening 23a near the center so as to have substantially the same rectangular shape as the opening 22a of the inner box 22. Thus, the top plate 23 is assembled to the outer box 21 and the inner box 22 held in the outer box 21 so as to close the gap between the outer and inner boxes 21 and 22 (the square annular gap around the inner box 22 as viewed perpendicularly from above).

Next, with reference to the drawings, the first wireless communication device 30 and the second wireless communication device 40 will be described in detail.

The first wireless communication device 30 includes a first control unit 31 and an antenna 32. The first control unit 31 is configured to include a circuit or the like that performs transmission using a known radio wave method in response to an instruction or the like from the control device 50. The first control unit 31 includes an oscillator, a modulator, an amplifier, and a demodulator, and is connected to the antenna 32 via the cable 33. For example, the first control unit 31 is configured to allow the modulator to modulate the oscillation signal generated by the oscillator, and output the modulated waves as transmission waves (transmission radio waves) via the antenna 32. When radio waves are received from a wireless tag T via the antenna 32, the first control unit 31 is configured to allow the demodulator to demodulate the radio waves to thereby acquire the product information and other information recorded on the wireless tag T.

The second wireless communication device 40 includes a second control unit 41 and an antenna 42, which have the same functions as those of the first control unit 31 and the antenna 32 described above, and also includes a cable 43 connecting between the second control unit 41 and the antenna 42. The second wireless communication device 40 is configured as a wireless communication device having functions equivalent to those of the first wireless communication device 30 to operate in response to an instruction or the like from the control device 50.

The antenna 32 of the first wireless communication device 30 configured in this way is arranged between the inner bottom surface 21b and the outer bottom surface 22b, so that the transmission direction of the transmission waves (see the arrow F1 of FIG. 2) is orthogonal to the outer bottom surface 22b in the vicinity of the center of the inner bottom surface 21b. The antenna 42 of the second wireless communication device 40 is arranged between the inner side surface 21c and the outer side surface 22c, so that the transmission direction of the transmission waves (see the arrow F2 of FIG. 2) is orthogonal to the outer side surface 22c in the vicinity of the center of the inner side surface 21c. Specifically, the antenna 32 of the first wireless communication device 30 and the antenna 42 of the second wireless communication device 40 are arranged so that the transmission directions of the transmission waves are orthogonal to each other.

With such an arrangement configuration or the like, stable wireless communication can be realized with respect to the wireless tags T in the predetermined communication area S that is an internal space defined by the inner box 22, and the reading success rate for the wireless tags T can be enhanced. The reason for this is as follows. Specifically, in the vicinity of the inner surfaces of the outer box 21, a null range is likely to occur due to the reflection of radio waves on the inner surfaces. However, since the inside of the inner box 22 held in the outer box 21 serves as the predetermined communication area S, the wireless tags T in the inner box 22 (in the predetermined communication area S) can be away from the vicinity of the inner surfaces of the outer box 21 in which the null range is likely to occur. In addition, the reason for this is that the top plate 23 can minimize leakage of the transmission waves to the outside via the opening 21a of the outer box 21.

The control device 50 is mainly configured by a microcomputer as an example. Specifically, the control device 50 includes a CPU (central processing unit) 50A performing calculation, and a main memory 50B as a work area, and also includes a system bus and an input/output interface, both of which are not shown, to configure a microcomputer together with a memory 51C. As will be described later, the CPU 50A controls operation of the control units.

In the memory 51C (including RAM (read only memory) 51Ca and ROM (random access memory) 51 Cb), a predetermined program or the like for the control is stored in advance so as to be executed by the CPU 50A. Therefore, the memory 51C functions as a non-transitory computer-readable recording medium, and the procedure of the program related to predetermined control processing is stored as a source code.

The program is read into the main memory 50B by the CPU 50A and executed. The main memory 50B is configured to be readable and writable using a memory element such as RAM. The CPU 50A is an element that plays a central role in the calculation performed in the computer system, and may have a different name (e.g., a processor or an arithmetic unit), as a matter of course, as long as it has the same functions. The control processing may be readably stored in an external storage device.

The control processing executed by the control device 50 (i.e., the CPU 50A) will be described later.

Next, the processing performed by the first and second wireless communication devices 30 and 40 will be described with reference to the drawings. This processing is performed under the control of the control device 50 (i.e., the CPU 50A) when reading a wireless tag T in the shopping basket B inserted in the storage box 20.

Figure 15:
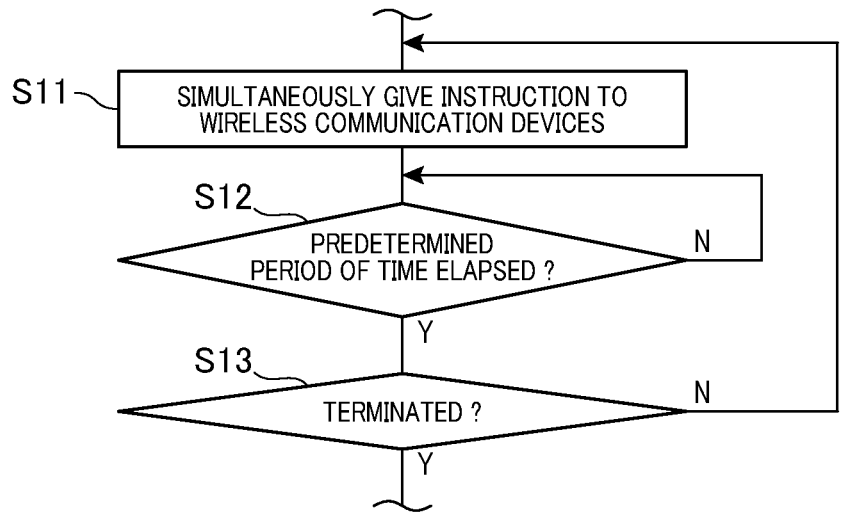
FIG. 15 is a schematic flow diagram illustrating a part of an example of transmission control.

When the shopping basket B is inserted in the storage box 20, the control device 50 instructs the first and second wireless communication devices 30 and 40 to start wireless communication processing (transmission instructions related to transmission of transmission waves) at predetermined intervals for a predetermined time (steps S11 to S13 of FIG. 15).

Specifically, the control device 50 outputs a transmission instruction for transmitting transmission waves on the channel 23 (23CH: 920.4 MHz) for a predetermined period of time or more to the first wireless communication device 30, while outputting a transmission instruction for transmitting transmission waves for a predetermined period of time or more to the second wireless communication device 40 on the channel 32 (32CH: 922 MHz) that does not interfere the channel 23 (step S11 of FIG. 15).

In particular, the control device 50 simultaneously gives transmission instructions to the first and second wireless communication devices 30 and 40. In the present embodiment, the frequency between the channels 23 and 32 will be referred to as "constant frequencies (or specific frequencies)" that determine the width of separation between these channels on the frequency band (or o (n the frequency axis).

Figure 16:
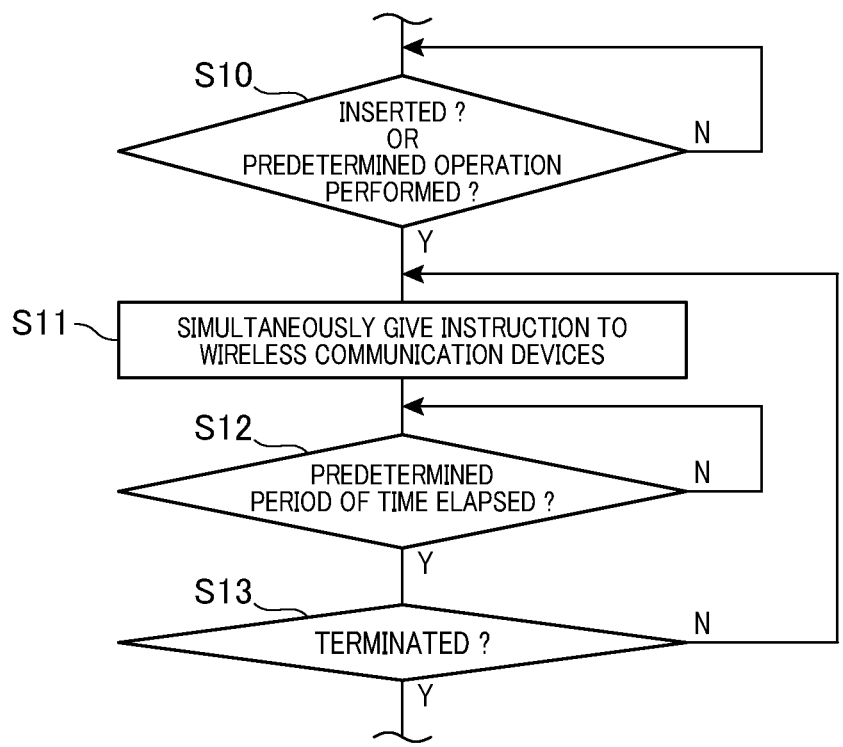
FIG. 16 is a schematic flow diagram illustrating a part of another example of transmission control.

The control device 50 may automatically give the above transmission instructions by detecting the state in which the shopping basket B is inserted in the storage box 20, using a sensor or the like provided to the storage box 20, or according to a predetermined operation or the like after insertion of the car B in the storage box 20 (steps S10 to S13 of FIG. 16).

In response to the transmission instructions from the control device 50, the first and second wireless communication devices 30 and 40 substantially simultaneously perform wireless communication processing to wirelessly communicate with the wireless tags T in the predetermined communication area S. Therefore, the first and second wireless communication devices 30 and 40 substantially simultaneously transmit transmission waves on different channels separated from each other by a predetermined channel number (or frequency) or more for a predetermined period of time or more.

Figure 4:
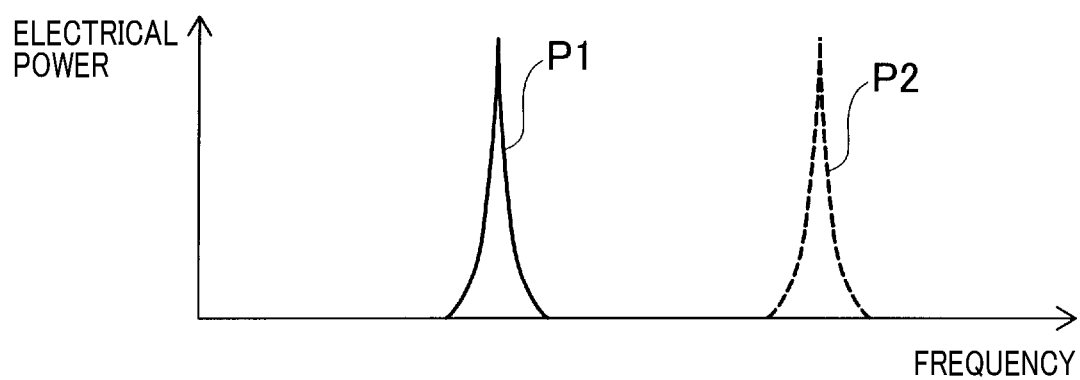
FIG. 4 is a diagram illustrating the electrical power obtained when a wireless tag receives transmission waves transmitted substantially simultaneously on different channels.

Referring to FIG. 4, the reason why transmission waves are substantially simultaneously transmitted on different channels will be described. FIG. 4 is a diagram illustrating electrical power obtained by a wireless tag T when receiving transmission waves transmitted substantially simultaneously on different channels. The vertical axis represents the electrical power obtained by the wireless tag T, and the horizontal axis represents the frequency of the transmission waves.

Wireless tags T receive transmission waves from the wireless communication devices to obtain electrical power required for operation as wireless tags. Therefore, if transmission waves are simply transmitted from the first wireless communication device 30, the wireless tag T as a target of wireless communication does not necessarily obtain required electrical power from the transmission waves due to the influence of the null range, or interference of radio waves, or the like. Similarly, if transmission waves are simply transmitted from the second wireless communication device 40, the wireless tag T as a target of wireless communication does not necessarily obtain required electrical power from the transmission waves.

In this regard, if transmission waves are substantially simultaneously transmitted from the first and second wireless communication devices 30 and 40 on different channels, the wireless tag T can receive both of the transmission waves substantially simultaneously because the frequency bandwidth of the wireless tag T is wide. That is, as shown in FIG. 4, the electrical power supply due to reception of transmission waves from the first wireless communication device 30 (see reference sign P1 of FIG. 4) and the electrical power supply due to reception of transmission waves from the second wireless communication device 40 (see reference sign P2 in FIG. 4) are conducted substantially simultaneously. Therefore, the wireless tag T can reliably obtain electrical power required for the operation as a wireless tag. In this case, the wireless tag T sends a reply to the wireless communication device, from which stronger transmission waves have been received, so that necessary data and other data can be transmitted.

As described above, in the wireless tag system 10 according to the present embodiment, the first and second wireless communication devices 30 and 40 perform wireless communication processing to wirelessly communicate with a wireless tag T in the predetermined communication area S. When performing this processing, transmission waves are substantially simultaneously transmitted (simultaneously for a predetermined period of time or more) on different channels separated from each other by a predetermined channel number (or frequency) or more.

Thus, one wireless tag T should receive transmission waves from the first and second wireless communication devices 30 and 40, and electrical power required for the operation of the wireless tag can be easily obtained. Therefore, electrical power according to the transmission waves can be reliably supplied to the wireless tag T as a target of wireless communication. Consequently, stable wireless communication can be achieved.

In particular, the wireless tag system 10 includes the control device 50 that gives transmission instructions regarding transmission of transmission waves to the first and second wireless communication devices 30 and 40, which perform wireless communication processing, in turn, in response to the transmission instructions received from the control device 50. Thus, the control device 50 can collectively control transmission of transmission waves sent from the first and second wireless communication devices 30 and 40. In particular, even when a specific channel becomes unavailable, the control device 50 can keep track of the unusable state to control the first and second wireless communication devices 30 and 40, avoiding the specific channel in question.

Furthermore, the wireless tag system 10 according to the present embodiment includes the outer box 21 disabling passage of radio waves therethrough except for the opening 21a, and the inner box 22 allowing passage of radio waves therethrough and held in the outer box 21 via the opening 21a, with the predetermined communication area S as an internal space defined by the inner box 22 held in the outer box 21. The antenna 32 of the first wireless communication device 30 and the antenna 42 of the second wireless communication device 40 are arranged between the inner surface of the outer box 21 and the outer surface of the inner box 22.

Therefore, transmission waves are prevented from being leaked from the outer box 21 to the outside. Accordingly, electrical power can be reliably supplied to the wireless tags T arranged in the internal space of the inner box 22 as the predetermined communication area S. In particular, in the vicinity of the inner surface of the outer box 21, a null range is likely to occur due to reflection of radio waves on the inner surface; however, since the internal space of the inner box held in the outer box 21 serves as the predetermined communication area S, the wireless tags T in the internal space (in the predetermined communication area) of the inner box 22 can be away from the vicinity of the inner surface of the outer box where a null range is likely to occur. Therefore, electrical power can be reliably supplied to the wireless tags T in the internal space of the inner box 22.

In particular, the antenna 32 of the first wireless communication device 30 is arranged between the inner bottom surface 21b of the outer box 21 and the outer bottom surface 22b of the inner box 22, while the antenna 42 of the second wireless communication device 40 is arranged between the inner side surface 21c of the outer box 21 and the outer side surface 22c of the inner box 22. Accordingly, the output direction of the transmission waves transmitted from the antenna 32 of the first wireless communication device 30 is substantially orthogonal to the output direction of the transmission waves transmitted from the antenna 42 of the second wireless communication device 40. Thus, electrical power can be reliably supplied to the wireless tags T regardless of the orientations of the wireless tags T in the internal space of the inner box 22.

The antenna 42 of the second wireless communication device 40 does not necessarily have to be arranged between the inner side surface 21c of the outer box 21 and the outer side surface 22c of the inner box 22, but may be arranged between the inner side surface 21d of the outer box 21 and the outer side surface 22d of the inner box 22, or between the inner side surface 21e of the outer box 21 and the outer side surface 22e of the inner box 22, or between the inner side surface 21f of the outer box 21 and the outer side surface 22f of the inner box 22. Furthermore, the antenna 32 of the first wireless communication device 30 does not necessarily have to be arranged between the inner bottom surface 21b of the outer box 21 and the outer bottom surface 22b of the inner box 22, but may be arranged between an inner side surface of the outer box 21 and an outer side surface of the inner box 22 so as to face the antenna 42, or may be arranged between an inner side surface of the outer box 21 and an outer side surface of the inner box 22 so that the output direction of the transmission waves is orthogonal to the antenna 42.

Second Embodiment

Next, a wireless tag system according to a second embodiment of the present invention will be described with reference to the drawings.

The second embodiment is mainly different from the first embodiment in that unmodulated waves are transmitted as transmission waves from one wireless communication device. Therefore, like reference signs are given to like components of the first embodiment to omit duplicate description.

Transmission waves transmitted to wirelessly communicate with a wireless tag T are modulated to carry signals from the viewpoint of electrical power supply, this may lower the supply efficiency for unmodulated waves. In this regard, in the present embodiment, one wireless communication device may transmit transmission waves modulated for wireless communication, and the other wireless communication device may transmit unmodulated waves as transmission waves for supplying electrical power to the wireless tag T to thereby easily enhance the power supply efficiency.

This is because unmodulated waves have a higher electrical power density than modulated waves that are modulated to carry signal waves, and thus because electrical power can be more reliably supplied to the wireless tag T as a target of communication according to the unmodulated wave, and even more stable wireless communication can be achieved.

Figure 5:
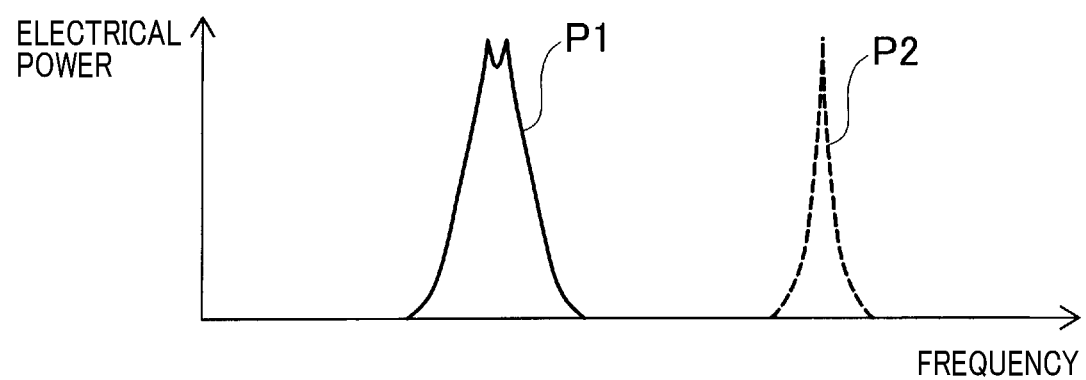
FIG. 5 is a diagram illustrating the electrical power obtained when a wireless tag receives unmodulated waves and modulated waves in a second embodiment.

In the present embodiment, the second wireless communication device 40 is configured to transmit unmodulated waves. Therefore, as can be seen from FIG. 5, the wireless tag T can receive electrical power supply due to reception of modulated transmission waves from the first wireless communication device 30 (see reference sign P1 of FIG. 5), and electrical power supply due to reception of unmodulated waves from the second wireless communication device 40 (see reference sign P2 of FIG. 5).

The wireless communication device transmitting unmodulated waves does not necessarily have to be the second wireless communication device 40, but may be the first wireless communication device 30.

Third Embodiment

Next, a wireless tag system according to a third embodiment of the present invention will be described with reference to the drawings.

The third embodiment is mainly different from the first embodiment in that the first wireless communication device 30 is configured as a master unit and the second wireless communication device 40 is configured as a slave unit. Therefore, like reference signs are given to like components of the first embodiment to omit duplicate description.

Figure 6:
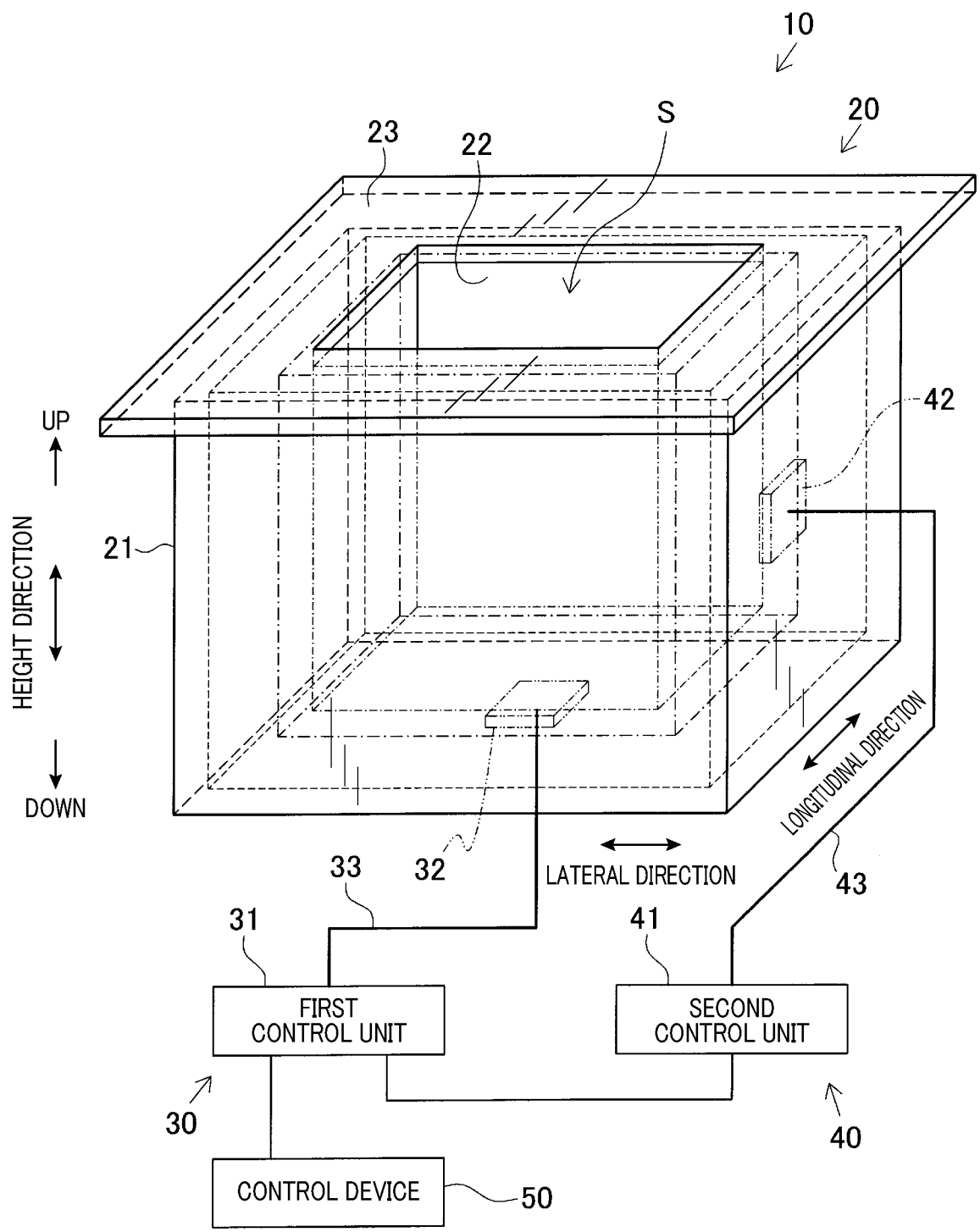
FIG. 6 is a schematic diagram illustrating a configuration of a wireless tag system according to a third embodiment.

In the present embodiment, as shown in FIG. 6, the first wireless communication device 30 is configured as a master unit and the second wireless communication device 40 is configured as a slave unit, so that a transmission instruction mentioned above can be supplied from the first wireless communication device 30 to the second wireless communication device 40. In other words, a transmission instruction is supplied from the control device 50 to the first wireless communication device 30. Thus, the first wireless communication device 30 gives a transmission instruction to the second wireless communication device 40 at each transmission time point of transmitting transmission waves, and the second wireless communication device 40 performs wireless communication processing in response to the transmission instruction received. In the present embodiment, the control device 50 is configured to collectively receive data acquired through the wireless communication processing of the first and second wireless communication devices 30 and 40 and other data, from the first wireless communication device 30.

Even in this way, channels and transmission times in the first and second wireless communication devices 30 and 40 can be easily controlled. In particular, there is no need to use higher-level devices respectively controlling the first and second wireless communication device 30 and 40. In addition to that, even in a situation where a specific channel cannot be used, the first and second wireless communication devices 30 and 40 can be controlled so as to avoid the specific channel in question by allowing the first wireless communication device 30 to keep track of the situation.

As a first modification of the third embodiment, it may be so configured that, under the transmission control of the control device 50, the first wireless communication device 30 transmits a control table, in which at least channels and transmission times of transmission waves are time-scheduled, to the second wireless communication device 40, and the second wireless communication device 40 performs wireless communication processing according to the control table received. Even in this way, channels and transmission times of the first and second wireless communication devices 30 and 40 can be easily controlled. In particular, there is no need to use higher-level devices respectively controlling the first and second wireless communication devices 30 and 40. In addition to that, the first and second wireless communication devices 30 and 40 are not required to communicate with each other every time transmission waves are transmitted. Accordingly, frequency of communication between the devices can be reduced.

The characteristic configuration according to the first modification of the third embodiment may be applied to the first embodiment. Specifically, as a first modification of the first embodiment, it may be configured so that the control device 50 transmits a control table, in which at least channels and transmission times of transmission waves are time-scheduled, to the first and second wireless communication devices 30 and 40, and the first and second wireless communication devices 30 and 40 perform wireless communication processing according to the control table received from the control device 50. Thus, the first and second wireless communication devices 30 and 40 do not need to communicate with the control device 50 every time the transmission waves are transmitted. Accordingly, frequency of communication with the control device 50 can be reduced.

It should be noted that the second wireless communication device 40 may be a master unit, and the first wireless communication device 30 may be a slave unit. The characteristic configurations of the present embodiment and the modification in which one of the wireless communication devices is a master unit and the rest are slave units can be applied to other embodiments and the like.

Fourth Embodiment

Next, a wireless tag system according to a fourth embodiment of the present invention will be described with reference to the drawings.

The fourth embodiment is mainly different from the first embodiment in that the first wireless communication device 30 detects a transmission status of transmission waves in the second wireless communication device 40 and performs wireless communication processing according to the detection results. Therefore, like reference signs are given to like components of the first embodiment to omit duplicate description.

In the present embodiment, the first control unit 31 of the first wireless communication device 30 is configured to be able to detect a transmission status, such as the channel used for transmission waves, in the second wireless communication device 40 according to the detection results derived from a detection unit. This detection unit detects the transmission status by receiving and analyzing transmission waves transmitted from the second wireless communication device 40. Then, when performing wireless communication processing, the first wireless communication device 30 simultaneously transmits transmission waves for a predetermined period of time on a channel different and separated from the channel of the second wireless communication device 40 by a predetermined channel number or more on the frequency band, according to the detection results derived from the detection unit.

Even in this way, channels and transmission times of the first and second wireless communication devices 30 and 40 can be easily controlled. In particular, there is no need to use higher-level devices that respectively control the first and second wireless communication devices 30 and 40. In addition to that, there is also no need to use the wireless communication device that serves as a master unit for controlling other wireless communication devices. As will be described later, when three or more wireless communication devices are adopted, at least some of the wireless communication devices may be provided with the detection unit mentioned above, so that stable wireless communication can be continued in the occurrence of a failure disabling transmission of transmission waves in one of the wireless communication devices.

Fifth Embodiment

Next, a wireless tag system according to a fifth embodiment of the present invention will be described with reference to the drawings.

The fifth embodiment is mainly different from the first embodiment in that the antenna arranged between an inner side surface of the outer box 21 and an outer side surface of the inner box 22 is inclined. Therefore, like reference signs are given to like components of the first embodiment to omit duplicate description.

Since the storage box 20 is provided with an opening 23a for inserting the shopping basket B therethrough, radio waves (transmission waves) may leak from the opening 23a. In particular, if transmission waves leak from the opening 23a passing over the top plate 23, for example, the wireless tag affixed to a product handled by the adjacent POS register (the wireless tag that is not the target of wireless communication) may be erroneously read.

Figure 7:
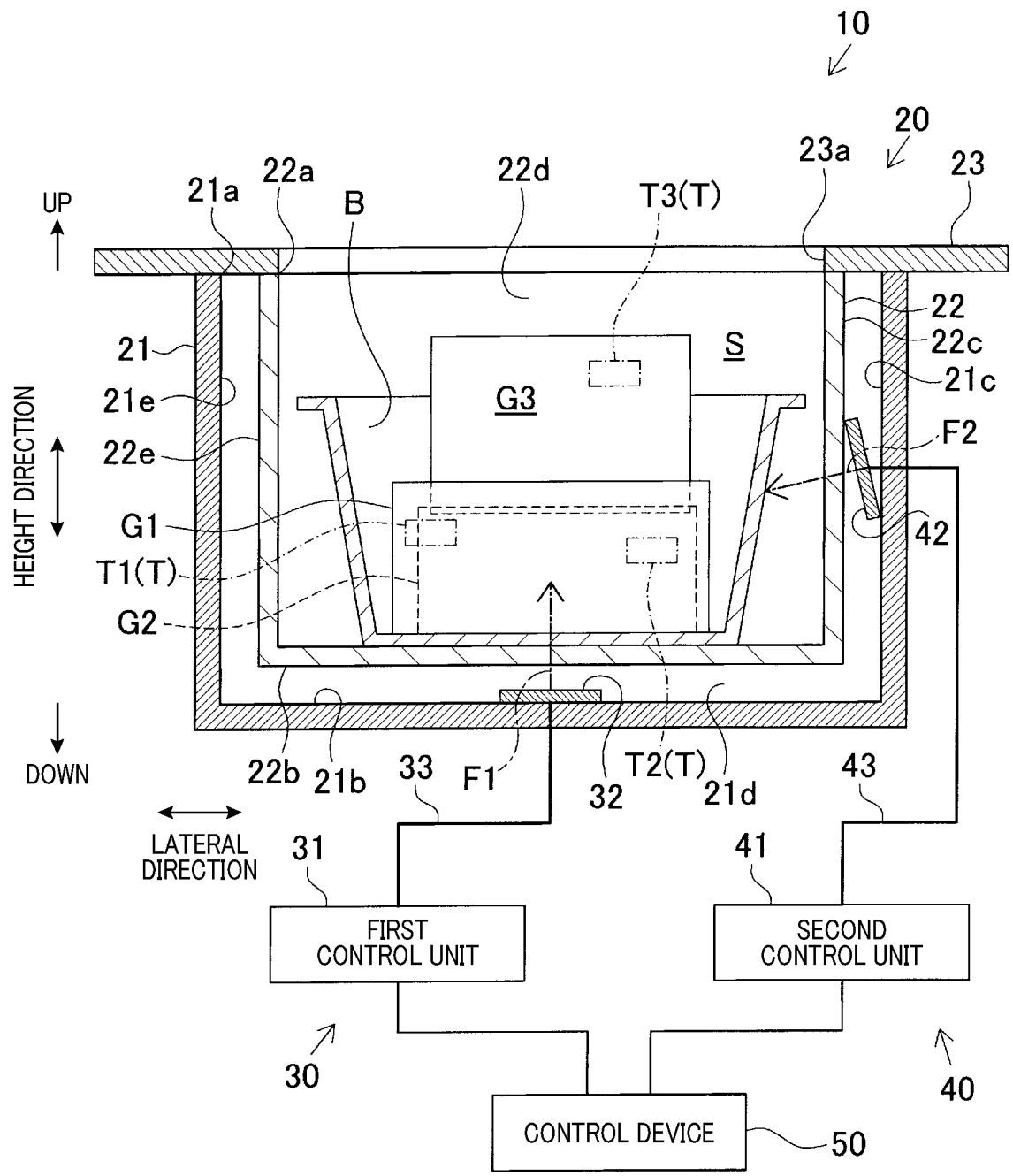
FIG. 7 is a schematic diagram illustrating a configuration of a wireless tag system according to a fifth embodiment.

In this regard, in the present embodiment, the antenna 42 of the second wireless communication device 40 is arranged so as to incline with respect to the inner side surface in a direction in which the output direction of the transmission waves is away from the opening 23a. Specifically, as shown in FIG. 7, the antenna 42 is arranged being inclined downward with respect to the inner side surface 21c so that the output direction of the transmission waves (see the arrow F2 of FIG. 7) is away from the opening 23a.

Thus, compared to the case where the antenna 42 of the second wireless communication device 40 is inclined with respect to the inner side surface in the direction in which the output direction of the transmission waves approaches the opening 23a, transmission waves transmitted from the antenna 42 are less likely to leak from the opening 23a passing over the top plate 23, to thereby minimize erroneous reading of a wireless tag located outside the predetermined communication area S.

The characteristic configuration of the present embodiment in which the antenna arranged between an inner side surface of the outer box 21 and an outer side surface of the inner box 22 is inclined can be applied to other embodiments and the like.

Sixth Embodiment

Next, a wireless tag system according to a sixth embodiment of the present invention will be described with reference to the drawings.

The sixth embodiment is mainly different from the first embodiment in that antennas are arranged on both lateral sides and both depth direction sides (both longitudinal sides) in the predetermined communication area S. Therefore, like reference signs are given to like components of the first embodiment to omit duplicate description.

Figure 8:
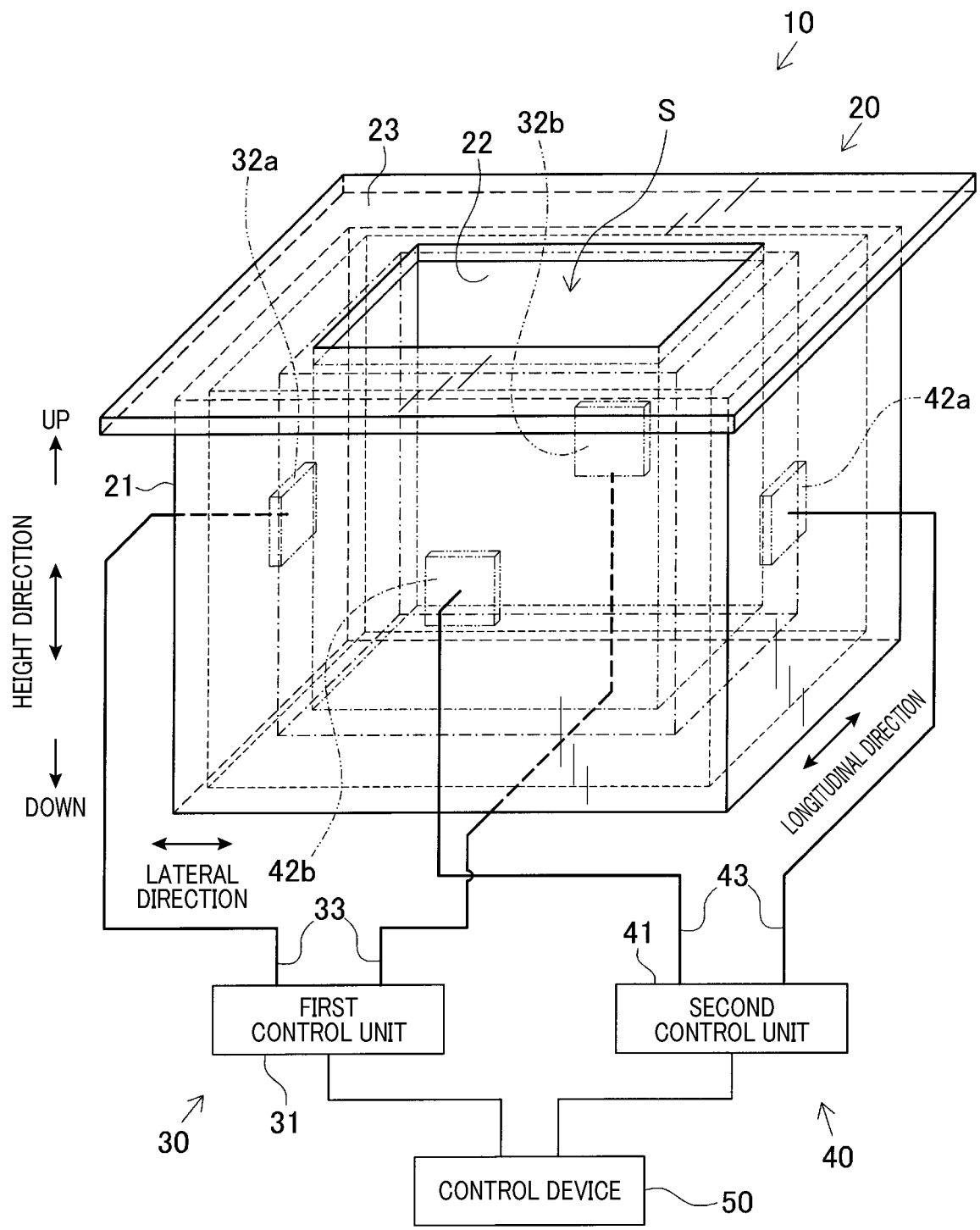
FIG. 8 is a schematic diagram illustrating a configuration of a wireless tag system according to a sixth embodiment.
Figure 9:
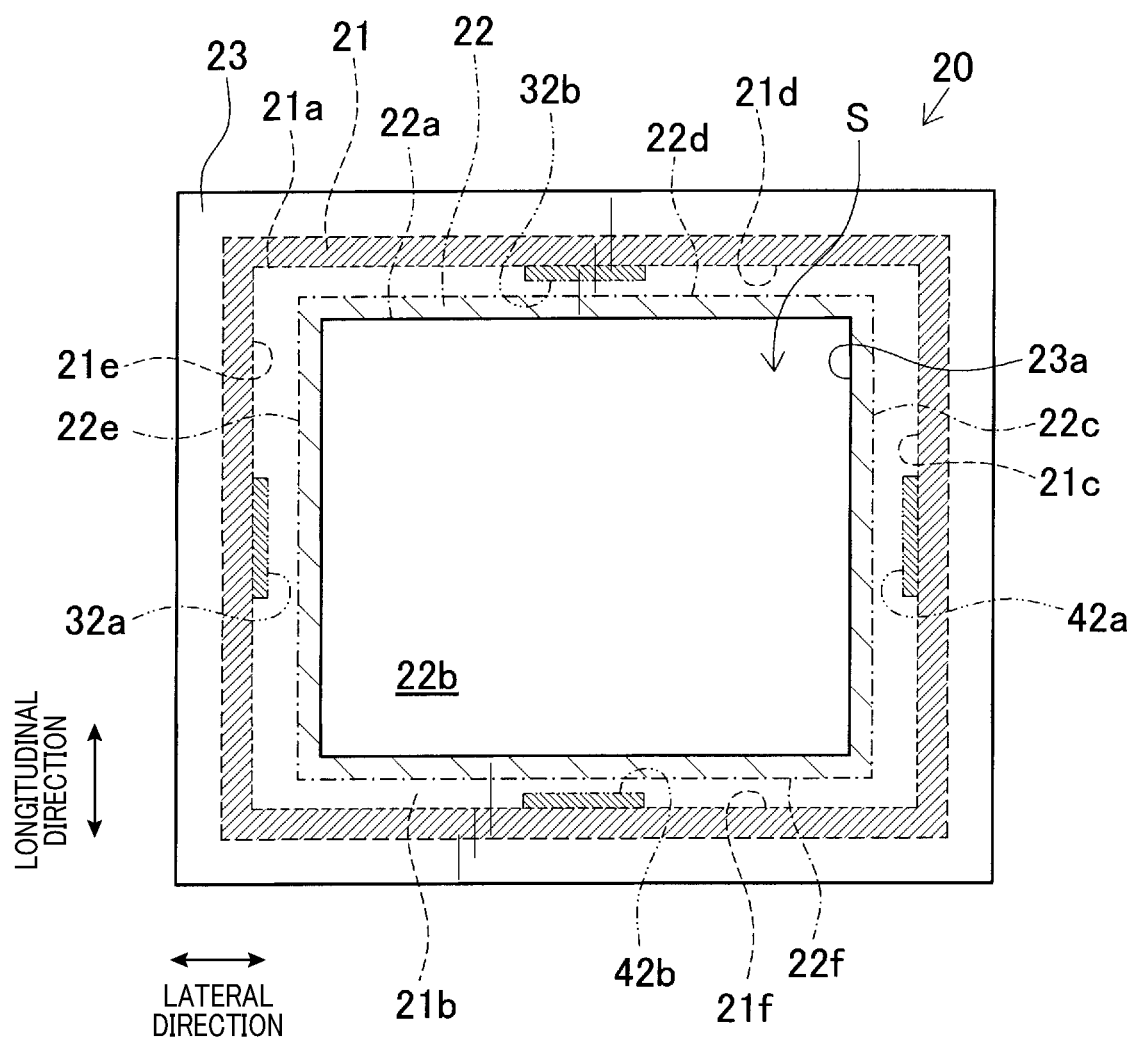
FIG. 9 is a plan view illustrating a part of the storage box shown in FIG. 8, as viewed perpendicular to an opening.

In the present embodiment, as shown in FIGS. 8 and 9, it is so configured that the first wireless communication device 30 includes two antennas 32a and 32b, and the second wireless communication device 40 includes two antennas 42a and 42b.

Specifically, the antenna 32a is arranged between the inner side surface 21e and the outer side surface 22e so that the transmission direction of the transmission waves is orthogonal to the outer side surface 22e in the vicinity of the center of the inner side surface 21e. The antenna 32b is arranged between the inner side surface 21d and the outer side surface 22d so that the transmission direction of the transmission waves is orthogonal to the outer side surface 22d in the vicinity of the center of the inner side surface 21d. The antenna 42a is arranged between the inner side surface 21c and the outer side surface 22c so that the transmission direction of the transmission waves is orthogonal to the outer side surface 22c in the vicinity of the center of the inner side surface 21c. The antenna 42b is arranged between the inner side surface 21f and the outer side surface 22f so that the transmission direction of the transmission waves is orthogonal to the outer side surface 22f in the vicinity of the center of the inner side surface 21f.

Specifically, the four antennas are respectively arranged between the inner side surfaces of the outer box 21 and the outer side surfaces of the inner box 22 so that the antennas 32a and 42a face each other in the lateral direction and the antennas 32b and 42b face each other in the depth direction. It should be noted that the antenna 32a may correspond to an example of "the first antenna of the first wireless communication device", and the antenna 32b may correspond to an example of "the second antenna of the first wireless communication device". Furthermore, the antenna 42a may correspond to an example of "the first antenna of the second wireless communication device", and the antenna 42b may correspond to an example of "the second antenna of the second wireless communication device".

Then, for the first and second wireless communication devices 30 and 40, the control device 50 alternates, at predetermined intervals, processing of simultaneously giving a transmission instruction using the antenna 32a and a transmission instruction using the antenna 42a, and processing of simultaneously giving a transmission instruction using the antenna 32b and a transmission instruction using the antenna 42b.

The first and second wireless communication devices 30 and 40 simultaneously perform wireless communication processing for a predetermined period of time or more on different channels which separate the transmission waves transmitted from the antenna 32a from the transmission waves transmitted from the antenna 42a by a predetermined frequency or more, and also perform wireless communication processing for a predetermined period of time or more on different channels which separate the transmission waves transmitted from the antenna 32b from the transmission waves transmitted from the antenna 42b by a predetermined frequency or more.

Thus, for the wireless tags T in the predetermined communication area S that is the internal space defined by the inner box 22, there can be repeatedly provided a time when electrical power is supplied with transmission waves transmitted from the antennas 32a and 42a, and a time when electrical power is supplied with transmission waves transmitted from the antennas 32b and 42b. In particular, since transmission waves are simultaneously transmitted from the two antennas facing each other for a predetermined period of time or more, radio waves can be easily mutually intensified and the electrical power supply to the wireless tags T can be increased. Therefore, even if the radio wave intensity of the transmission waves is lowered for the purpose of minimizing erroneous reading of wireless tags T located outside the predetermined communication area S, electrical power corresponding to the transmission waves can be reliably supplied to the wireless tag T as a target of wireless communication.

Figure 10:
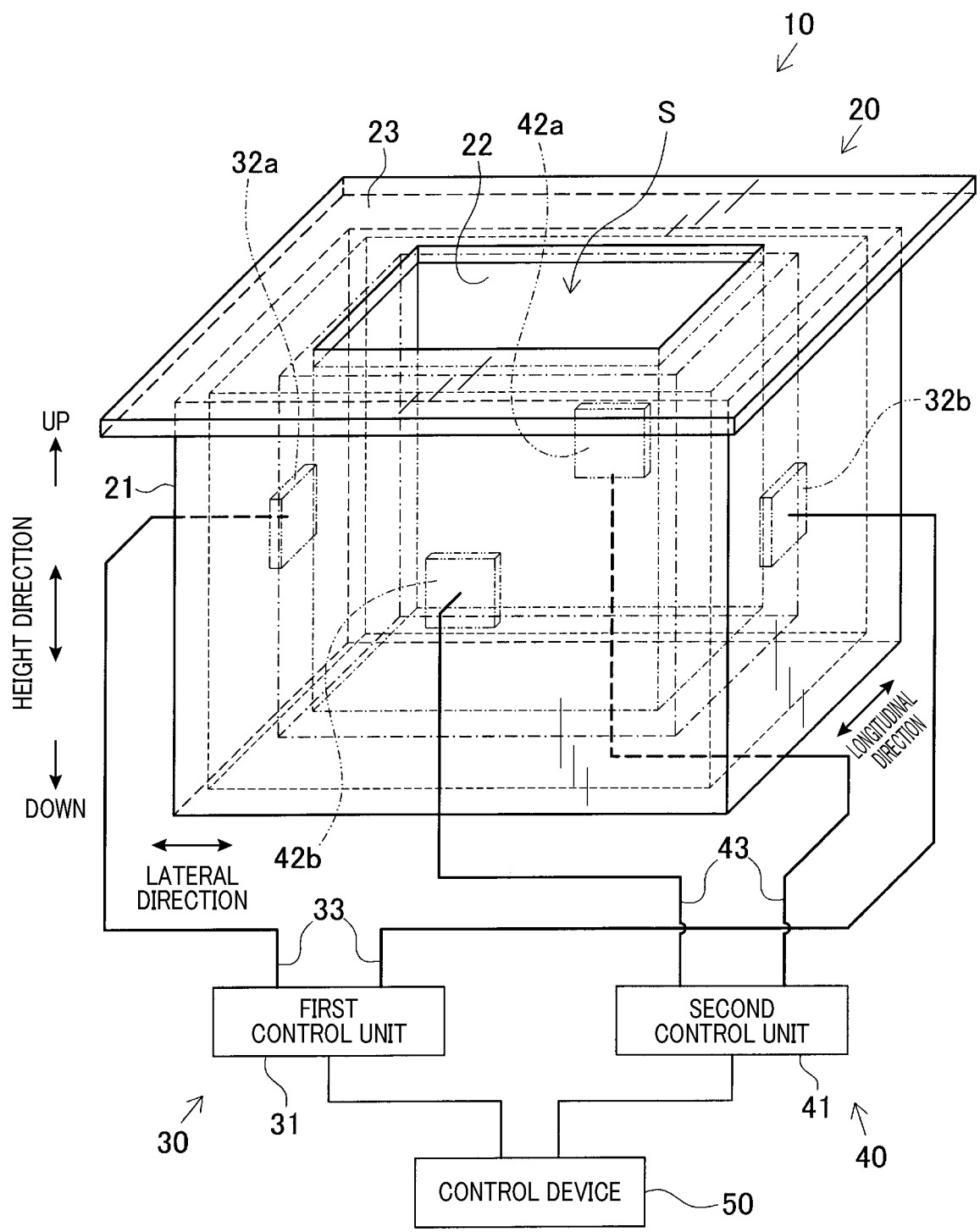
FIG. 10 is a schematic diagram illustrating a configuration of a wireless tag system according to a modification of the sixth embodiment.

As a modification of the present embodiment, as shown in FIG. 10, the four antennas may be respectively arranged between the inner side surfaces of the outer box 21 and the outer side surfaces of the inner box 22 such that the antennas 32a and 32b face each other and the antennas 42a and 42b face each other. Even in this way, for the wireless tags T in the predetermined communication area S that is the internal space defined by the inner box 22, there can be repeatedly provided a time when electrical power is supplied with the transmission waves transmitted from the antennas 32a and 42a, and a time when electrical power is supplied with the transmission waves transmitted from the antennas 32b and 42b. Therefore, even if the radio wave intensity of the transmission waves is lowered for the purpose of minimizing erroneous reading of wireless tags T located outside the predetermined communication area S, electrical power corresponding to the transmission waves can be reliably supplied to the wireless tag T as a target of wireless communication.

The characteristic configurations of the present embodiment and the modification in which antennas are respectively arranged in four directions in the predetermined communication area S can be applied to other embodiments and the like.

Seventh Embodiment

Next, a wireless tag system according to a seventh embodiment of the present invention will be described with reference to the drawings.

The seventh embodiment is mainly different from the first embodiment in that a third wireless communication device 60 is adopted in addition to the first and second wireless communication devices 30 and 40. Therefore, like reference signs are given to like components of the first embodiment to omit duplicate description.

Figure 12:
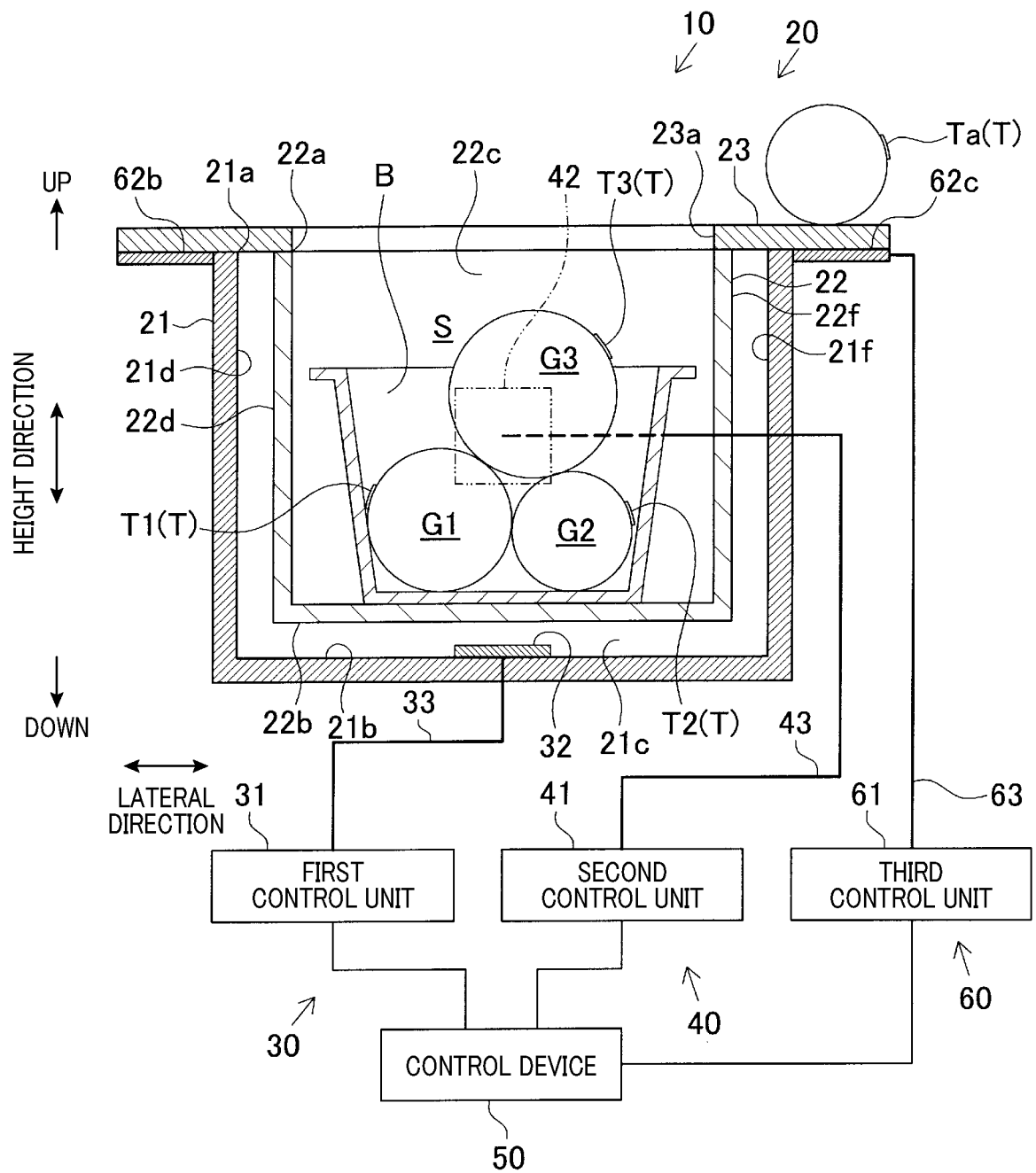
FIG. 12 is a schematic diagram illustrating a configuration of a wireless tag system according to a seventh embodiment.

In the present embodiment, as shown in FIG. 12, the wireless tag system 10 is configured to newly include a third wireless communication device 60 in addition to the first and second wireless communication devices 30 and 40. The third wireless communication device 60 includes a third control unit 61 and antennas 62a to 62c, which have the same functions as those of the first control unit 31 and the antenna 32 described above, and also includes a cable 63 connecting the third control unit 61 to the antennas 62a to 62c. The third wireless communication device 60 is configured as a wireless communication device having functions equivalent to those of the first wireless communication device 30, and these functions are exerted according to an instruction or the like supplied from the control device 50 (see the transmission instruction flow of FIG. 15).

Figure 13:
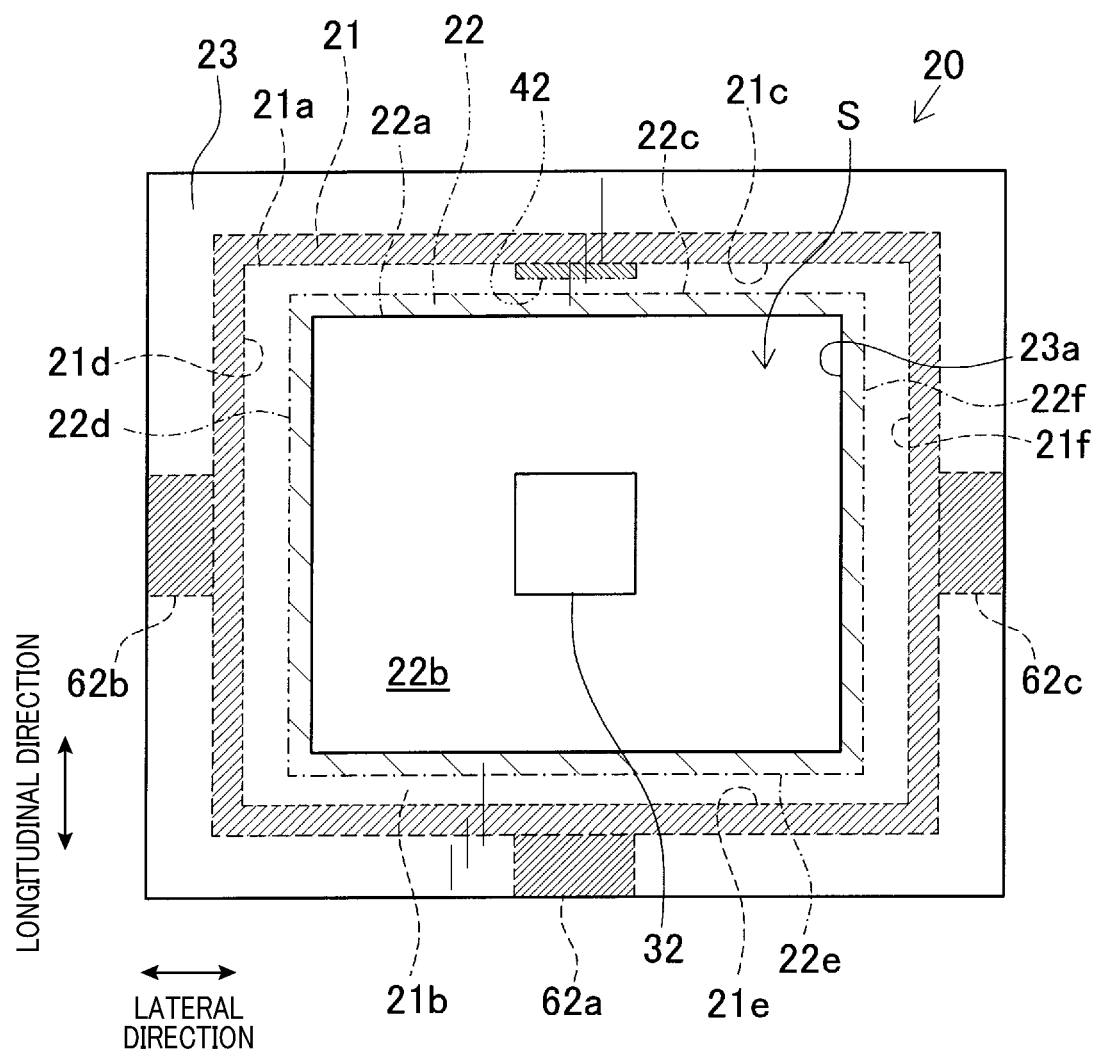
FIG. 13 is a plan view illustrating a part of the storage box shown in FIG. 12, as viewed perpendicular to an opening.

As shown in FIG. 13, the antennas 62a to 62c are arranged at positions outside the outer box 21, i.e., around the opening 21a, to read wireless tags T located outside the predetermined communication area S. Specifically, the antenna 62a is provided on the lower surface of the top plate 23 on the side where the user stands to place the product with a wireless tag T in the inner box 22, so that the transmission direction of the transmission waves will be upward. The antennas 62b and 62c are provided on the lower surface of the top plate 23 so as to face each other via the opening 21a, so that the transmission directions of the transmission waves will be upward.

With the antennas 62a to 62c being arranged in this way, the third wireless communication device 60 can read a wireless tag (see reference sign Ta of FIG. 12) on the surface around the opening 21a outside the predetermined communication area S more easily than the first and second wireless communication devices 30 and 40. Thus, erroneous reading can be minimized, which may be due to the wireless tag T (Ta) on the surface around the opening 21a being read by the first wireless communication device 30 or the second wireless communication device 40.

In the present embodiment, the control device 50 uses received signal strength (RSSI) resulting from wireless communication of the first, second and third wireless communication device 30, 40 and 60 to serve as a reading unit that reads information from a wireless tag T in the predetermined communication area S that is an internal space defined by the inner box 22. Due to the antenna arrangement as described above, the first wireless communication device 30 or the second wireless communication device 40 will have a received signal strength that is higher when reading the wireless tags T (T1 to T3) in the predetermined communication area S than when reading the wireless tag T (Ta) outside the predetermined communication area S, while the third wireless communication device 60 will have a received signal strength that is higher when reading the wireless tag T (Ta) outside the predetermined communication area S than when reading the wireless tags T (T1 to T3) in the predetermined communication area S.

Therefore, even if a wireless tag T is read by all the wireless communication devices, the wireless tag T for which the first wireless communication device 30 or the second wireless communication device 40 has a higher received signal strength is determined to be a wireless tag T in the predetermined communication area S, and the wireless tag T for which the third wireless communication device 60 has a higher received signal strength is determined to be a wireless tag T outside the predetermined communication area S. Thus, an accurate determination can be made as to whether the read wireless tag T is on the inside of the predetermined communication area S.

In particular, by alternately repeating a time when wireless communication of the first and second wireless communication devices 30 and 40 is performed and a time when the wireless communication of the third wireless communication device 60 is performed, wireless communication of the first and second wireless communication devices 30 and 40 and wireless communication of the third wireless communication device 60 can be mutually exclusively performed. Thus, electrical power obtained by the wireless tag T according to the transmission waves from the first wireless communication device 30 or the second wireless communication device 40 will not be used during wireless communication with the third wireless communication device 60. This may enhance measurement accuracy of the received signal strength obtained during wireless communication of the third wireless communication device 60. Accordingly, an even more accurate determination can be made as to whether the read wireless tag T is on the inside of the predetermined communication area S.

The third wireless communication device 60 is not limited to have a configuration including the antennas 62a to 62c, but may have a configuration including one or two or more antennas which are arranged outside the outer box 21 so that the wireless tag T in the predetermined communication area S is less likely to be read. Even in this way, the wireless tag T that has been read not only by the first and second wireless communication devices 30 and 40 but also by the third wireless communication device 60 can be determined to be a wireless tag T having a high probability of being located outside the predetermined communication area S. This may minimize erroneous reading of the wireless tag T located outside the predetermined communication area S.

Figure 14:
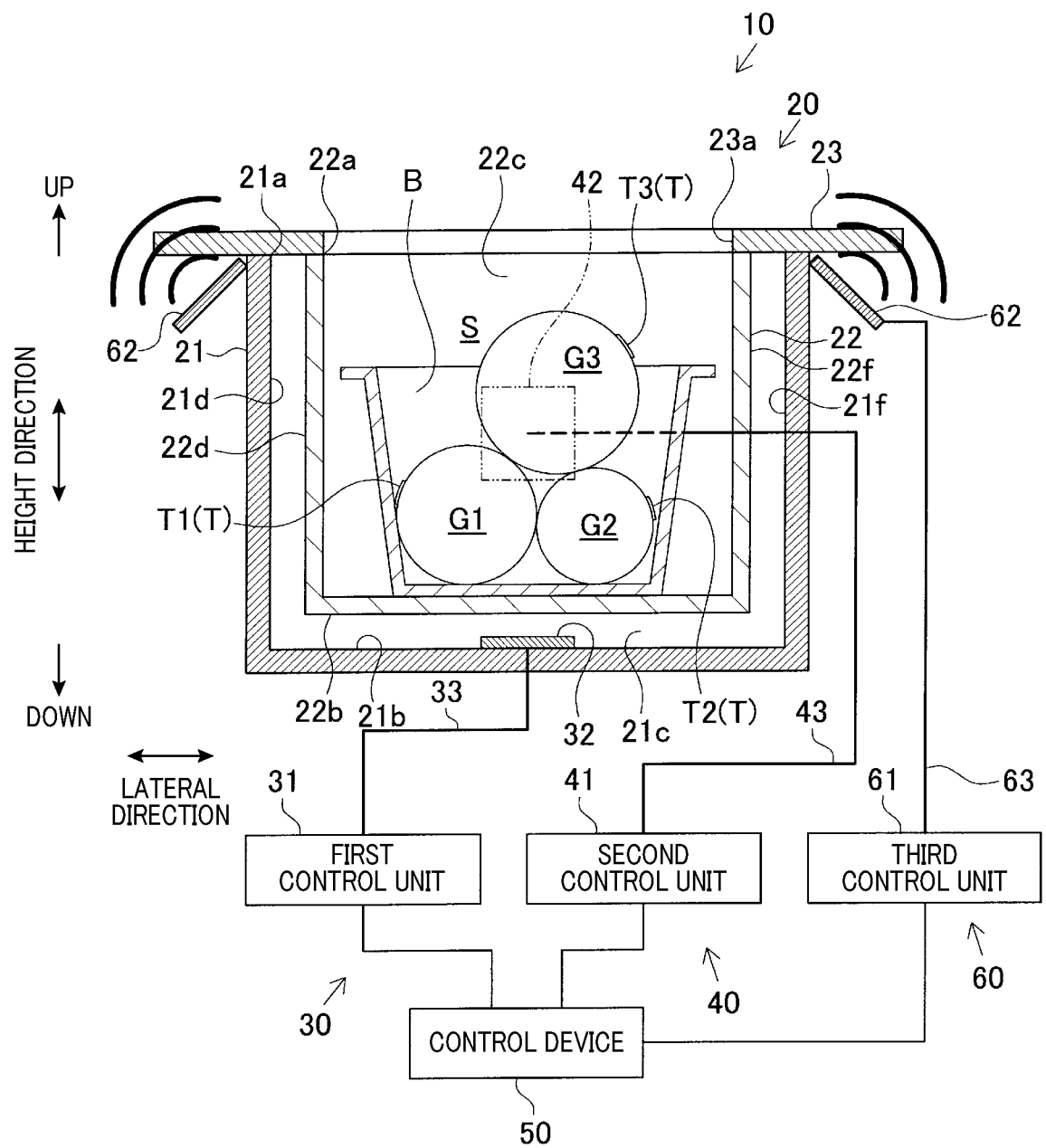
FIG. 14 is a schematic diagram illustrating a wireless tag system according to a modification of the seventh embodiment.

Specifically, for example, as in the modification of the present embodiment shown in FIG. 14, the antenna 62 of the third wireless communication device 60 may be arranged being inclined with respect to a plane provided by the opening 21a so that the output direction of the transmission waves will be away from the opening 21a. Thus, the third wireless communication device 60 is less likely to read the wireless tag T in the predetermined communication area S, and thus erroneous reading due to the reading that would be performed by the third wireless communication device 60 can be minimized.

The characteristic configurations of the present embodiment and the modification in which the third wireless communication device 60 is newly adopted can be applied to other embodiments and the like.

The present invention is not limited to the above embodiments, but may be embodied as follows, for example.

Figure 11:
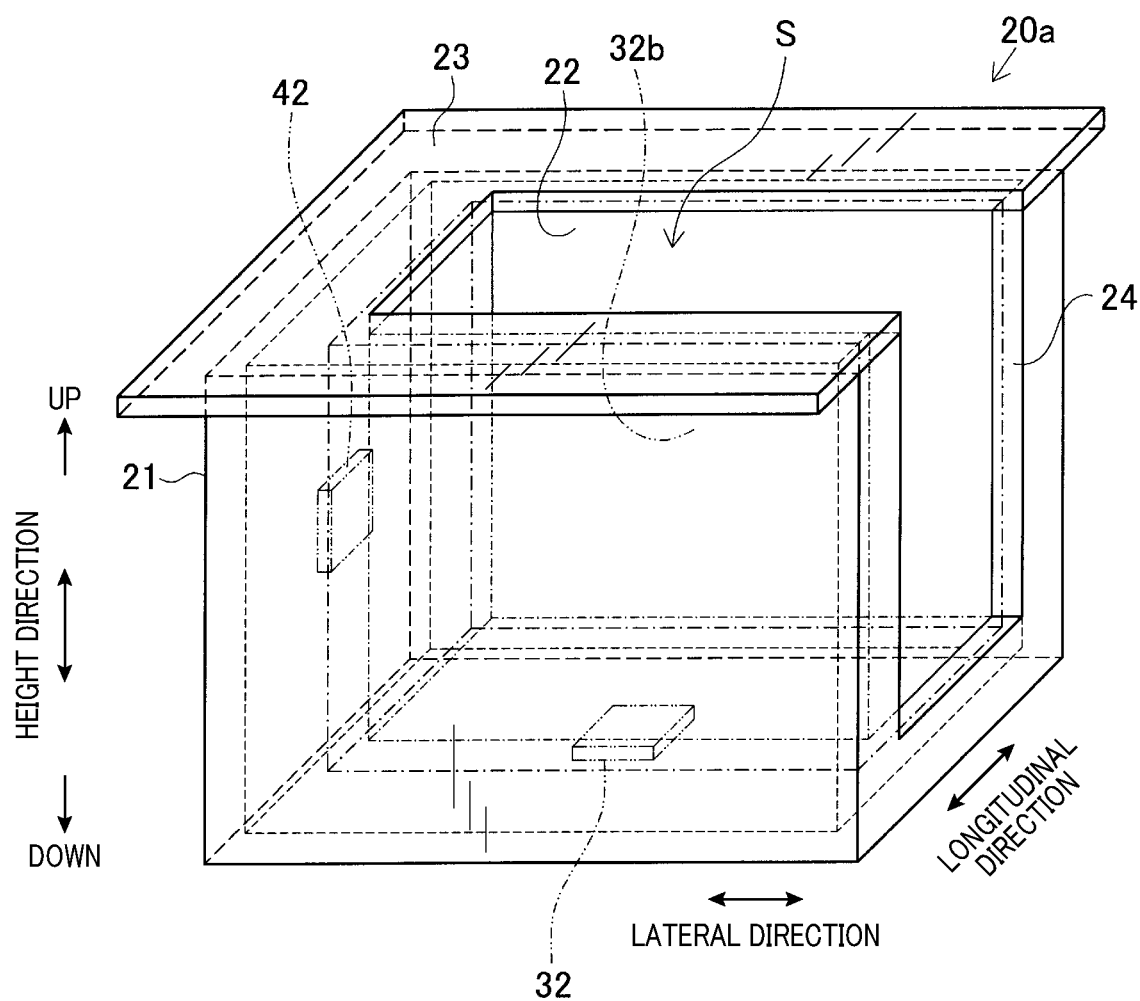
FIG. 11 is a perspective view illustrating a modification of a storage box.

(1) The predetermined communication area S is not limited to be configured by the storage box 20 having an opening, i.e., the opening 23a, on top, but may be configured by a storage box having an opening in at least a part of another surface. For example, as shown in FIG. 11, the predetermined communication area S may be configured by a storage box 20a that is open from the top to a side surface as an opening 24. Furthermore, the storage box is not limited to have a rectangular bottom surface, but may have, for example, a polygonal or circular bottom surface. Furthermore, the predetermined communication area S is not limited to be an internal space clearly defined by the wall surfaces or the like such as of the storage box 20 or 20a, but may be configured by a part of a space not clearly defined by wall surfaces or the like.

(2) The present invention is not limited to be applied to the wireless tag system 10 having two wireless communication devices 30 and 40, but may be applied to a wireless tag system having three or more wireless communication devices. In such a configuration, the wireless communication devices simultaneously transmit transmission waves for a predetermined period of time or more on different channels separated from each other by a predetermined channel number or more when performing wireless communication processing to wirelessly communicate with a wireless tag T in the predetermined communication area S. Even in this way, transmission waves from the plurality of wireless communication devices should be received by one wireless tag T, and electrical power required for the operation of this wireless tag can be easily obtained. Therefore, electrical power according to transmission waves can be reliably supplied to the wireless tag T as a target of wireless communication, as a result of which, stable wireless communication can be achieved.

(3) Furthermore, the present invention is not limited to be applied to a wireless tag system for selling products, but may be applied to a wireless tag system targeting wireless tags located in a predetermined communication area within a relatively narrow range.

DESCRIPTION OF REFERENCE SIGNS

10 . . . Wireless tag system
20, 20a . . . Storage box
21 . . . Outer box
22 . . . Inner box
30 . . . First wireless communication device
32, 32a, 32b . . . Antenna
40 . . . Second wireless communication device
42, 42a, 42b . . . Antenna
50 . . . Control device
60 . . . Third wireless communication device
62, 42a to 62c . . . Antenna
B . . . Shopping basket
S . . . Predetermined communication area
T, T1 to T3 . . . Wireless tag

What is claimed is:

1. A wireless tag system comprising:
two or more wireless communication devices which are enabled to wirelessly communicate with a wireless tag to be placed in a predetermined physically defined communication area;
the two or more wireless communication devices being configured to transmit transmission waves on mutually different channels and simultaneously transmit the transmission waves toward the predetermined physically defined communication area for a predetermined period of time or a period of time larger than the predetermined period of time, the different channels being separated from each other in a frequency band by a predetermined frequency or a frequency higher than the predetermined frequency and having no interference in the transmission waves between different channels, the transmission waves transmitted by the two or more wireless communication device being intensified in power in the predetermined physically defined communication area such that electrical power supply to the wireless tag is increased more than outside the predetermined physically defined communication area; and the wireless tag being configured to have frequency bandwidth characteristics which enable the wireless tag to simultaneously receive the transmission waves transmitted by two or more wireless communication devices.

2. The wireless tag system according to claim 1, wherein at least any one of the two or more wireless communication devices is configured to transmit unmodulated waves as the transmission waves to the wireless tag to supply electrical power.

3. The wireless tag system according to claim 2, wherein any one of the two or more wireless communication devices is configured to supply a transmission instruction related to transmission of the transmission waves to the rest of the wireless communication devices at every time point of transmitting the transmission waves; and
the rest of the wireless communication devices are configured to perform the wireless communication processing according to the transmission instruction received.

4. The wireless tag system according to claim 2, wherein any one of the two or more wireless communication devices is configured to transmit a control table, in which at least channels and transmission times of the transmission waves are time-scheduled, to the rest of the wireless communication devices; and
the rest of the wireless communication devices are configured to perform the wireless communication processing according to the control table received.

5. The wireless tag system according to claim 2, wherein at least some of the two or more wireless communication devices include a detection unit configured to detect a transmission status of the transmission waves in the rest of the wireless communication devices, and simultaneously transmit the transmission waves according to detection results derived from the detection unit, for a predetermined period of time or the period of time larger than the predetermined period of time on the channel different and separated from channels of the rest of the wireless communication devices by the predetermined frequency or the frequency higher than the predetermined frequency, when performing the wireless communication processing.

6. The wireless tag system according to claim 2, wherein the system comprises a control device configured to provide a transmission instruction related to transmission of the transmission waves to the two or more wireless communication devices; and
the two or more wireless communication devices are configured to perform the wireless communication processing according to the transmission instruction received from the control device.

7. The wireless tag system according to claim 2, wherein the system comprises a control device configured to transmit a control table, in which at least channels and transmission times of the transmission waves are time-scheduled, to the two or more wireless communication devices; and
the two or more wireless communication devices are configured to perform the wireless communication processing according to the control table received from the control device.

8. The wireless tag system according to claim 2, comprising:
an outer box disabling passage of radio waves except through an opening; and
an inner box enabling passage of radio waves and held in the outer box via the opening, wherein
the radio waves are provided as the transmission waves;
the two or more wireless communication devices include a first wireless communication device and a second wireless communication device;
the predetermined physically defined communication area is configured by an internal space physically defined by the inner box that is held in the outer box; and
an antenna of the first wireless communication device and an antenna of the second wireless communication device are each arranged between an inner surface of the outer case and an outer surface of the inner box.

9. The wireless tag system according to claim 1, wherein any one of the two or more wireless communication devices is configured to supply a transmission instruction related to transmission of the transmission waves to the rest of the wireless communication devices at every time point of transmitting the transmission waves; and
the rest of the wireless communication devices is configured to perform the wireless communication processing according to the transmission instruction received.

10. The wireless tag system according to claim 1, wherein any one of the two or more wireless communication devices is configured to transmit a control table, in which at least channels and transmission times of the transmission waves are time-scheduled, to the rest of the wireless communication devices; and
the rest of the wireless communication devices are configured to perform the wireless communication processing according to the control table received.

11. The wireless tag system according to claim 1, wherein at least some of the two or more wireless communication devices include a detection unit configured to detect a transmission status of the transmission waves in the rest of the wireless communication devices, and simultaneously transmit the transmission waves according to detection results derived from the detection unit, for the predetermined period of time or the period of time larger than the predetermined period of time on the channel different and separated from channels of the rest of the wireless communication devices by the predetermined frequency or the frequency higher than the predetermined frequency, when performing the wireless communication processing.

12. The wireless tag system according to claim 1, wherein the system comprises a control device configured to provide a transmission instruction related to transmission of the transmission waves to the two or more wireless communication devices; and
the two or more wireless communication devices are configured to perform the wireless communication processing according to the transmission instruction received from the control device.

13. The wireless tag system according to claim 1, wherein the system comprises a control device configured to transmit a control table, in which at least channels and transmission times of the transmission waves are time-scheduled, to the two or more wireless communication devices; and
the two or more wireless communication devices are configured to perform the wireless communication processing according to the control table received from the control device.

14. The wireless tag system according to claim 1, wherein the two or more wireless communication devices are configured to transmit the transmission waves along transmission directions, the transmission directions being either orthogonal to each other or opposed to each other.

15. The wireless tag system according to claim 1, comprising:
an outer box disabling passage of radio waves except through an opening; and
an inner box enabling passage of radio waves and held in the outer box via the opening, wherein
the radio waves are provided as the transmission waves;
the two or more wireless communication devices include a first wireless communication device and a second wireless communication device;
the predetermined communication area is configured by an internal space physically defined by the inner box that is held in the outer box; and
an antenna of the first wireless communication device and an antenna of the second wireless communication device are each arranged between an inner surface of the outer case and an outer surface of the inner box.

16. The wireless tag system according to claim 15, wherein
the outer box includes, as the inner surfaces, a rectangular inner bottom surface facing the opening, and four inner side surfaces respectively connected to four sides of the inner bottom surface; and
the antenna of the first wireless communication device is arranged between the inner bottom surface and an outer surface of the inner box, and the antenna of the second wireless communication device is arranged between any one of the four inner side surfaces and an outer surface of the inner box.

17. The wireless tag system according to claim 16, wherein the antenna of the second wireless communication device is arranged being inclined with respect to the inner side surface such that an output direction of the transmission waves is away from the opening.

18. The wireless tag system according to claim 15, wherein
the outer box includes, as the inner surfaces, a rectangular inner bottom surface facing the opening, and four inner side surfaces respectively connected to four sides of the inner bottom surface;
the first wireless communication device and the second wireless communication device each include two antennas as first and second antennas;
four antennas are respectively arranged between inner surfaces of the outer box and outer surfaces of the inner box such that a first antenna of the first wireless communication device faces a first antenna of the second wireless communication device and a second antenna of the first wireless communication device faces a second antenna of the second wireless communication device; and
the first wireless communication device and the second wireless communication device are configured to simultaneously perform the wireless communication processing for the predetermined period of time or the period of time larger than the predetermined period of time on the different channels which separate at which transmission waves are transmitted from the first antenna of the first wireless communication device and from the first antenna of the second wireless communication device, the different channels being separate from each other by a predetermined channel number or more, or also simultaneously perform the wireless communication processing for a predetermined period of time or more on different channels at which separate transmission waves are transmitted from the second antenna of the first wireless communication device and from the second antenna of the second wireless communication device, the different channels being separate from each other by the predetermined channel number or the channel number larger than the predetermined channel number.

19. The wireless tag system according to claim 15, wherein
the outer box includes, as the inner surfaces, a rectangular inner bottom surface facing the opening, and four inner side surfaces respectively connected to four sides of the inner bottom surface;
the first wireless communication device and the second wireless communication device each include two antennas as first and second antennas;
four antennas are respectively arranged between inner surfaces of the outer box and outer surfaces of the inner box such that a first antenna and a second antenna of the first wireless communication face each other, and a first antenna and a second antenna of the second wireless communication face each other; and
the first wireless communication device and the second wireless communication device are configured to simultaneously perform the wireless communication processing for the predetermined period of time or the period of time larger than the predetermined period of time on the different channels at which separate transmission waves are transmitted from the first antenna of the first wireless communication device and from the first antenna of the second wireless communication device, the different channels being separate from each other by a predetermined channel number or more, or also simultaneously perform the wireless communication processing for a predetermined period of time or more on different channels at which separate transmission waves are transmitted from the second antenna of the first wireless communication device and the second antenna of the second wireless communication device, the different channels being separate from each other by the predetermined channel number or the channel number larger than the predetermined channel number.

20. The wireless tag system according to claim 15, wherein
the two or more wireless communication devices include a third wireless communication device in addition to the first wireless communication device and the second wireless communication device;
the system includes a reading unit configured to read information from the wireless tag located in the predetermined physically defined communication area provided as an internal space defined by the inner box, based on wireless communication results derived from the first wireless communication device, the second wireless communication device, and the third wireless communication device; and
the third wireless communication device is provided with an antenna arranged outside the outer box.

21. The wireless tag system according to claim 20, wherein the antenna of the third wireless communication device is arranged outside the outer box so as to be located around the opening.

22. The wireless tag system according to claim 21, wherein the antenna of the third wireless communication device is arranged being inclined with respect to a plane provided by the opening such that an output direction of transmission waves from the antenna of the third wireless communication device is away from the opening.

23. The wireless tag system according to claim 20, wherein the reading unit is configured to read information from the wireless tag located in the predetermined physically defined communication area provided as an internal space defined by the inner box, based on received signal strength resulting from wireless communication of the first wireless communication device, the second wireless communication device, and the third wireless communication device.

24. The wireless tag system according to claim 23, wherein wireless communication by the third wireless communication device is performed mutually exclusively with respect to wireless communication of the first wireless communication device and the second wireless communication device.

* * * * *